US008744362B2

(12) United States Patent
Kawahatsu et al.

(10) Patent No.: US 8,744,362 B2
(45) Date of Patent: Jun. 3, 2014

(54) BASE STATION

(75) Inventors: Takuji Kawahatsu, Tokyo (JP); Rintaro Katayama, Fujisawa (JP); Satoshi Tamaki, Yokohama (JP); Tomonori Yamamoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 13/152,036

(22) Filed: Jun. 2, 2011

(65) Prior Publication Data
US 2011/0317742 A1 Dec. 29, 2011

(30) Foreign Application Priority Data
Jun. 3, 2010 (JP) ................................. 2010-128023

(51) Int. Cl.
*H04B 1/00* (2006.01)
*H04B 15/00* (2006.01)

(52) U.S. Cl.
USPC ......... 455/63.1; 455/63.2; 455/443; 455/446; 455/449

(58) Field of Classification Search
USPC ........................ 455/63.1, 63.2, 443, 446, 449
See application file for complete search history.

(56) References Cited

U.S. PATENT DOCUMENTS

| 5,548,807 | A | 8/1996 | Ueda |
| 7,529,548 | B2 * | 5/2009 | Sebastian .................... 455/452.1 |
| 8,340,038 | B2 * | 12/2012 | Guvenc ......................... 370/329 |
| 2004/0037248 | A1 | 2/2004 | Tamaki et al. |
| 2005/0186983 | A1 | 8/2005 | Iochi |
| 2007/0081449 | A1 * | 4/2007 | Khan ............................. 370/208 |
| 2007/0147536 | A1 * | 6/2007 | Melzer et al. ................. 375/267 |
| 2007/0223606 | A1 * | 9/2007 | Yang et al. .................... 375/260 |
| 2009/0022098 | A1 * | 1/2009 | Novak et al. .................. 370/329 |
| 2009/0042595 | A1 * | 2/2009 | Yavuz et al. ................... 455/522 |
| 2010/0216450 | A1 | 8/2010 | Fujishima et al. |
| 2010/0222068 | A1 * | 9/2010 | Gaal et al. .................... 455/450 |
| 2010/0240386 | A1 * | 9/2010 | Hamabe et al. ............ 455/452.2 |

(Continued)

FOREIGN PATENT DOCUMENTS

| EP | 1 519 498 A1 | 3/2005 |
| EP | 2 224 765 A2 | 9/2010 |

(Continued)

OTHER PUBLICATIONS

Communication with partial European Search Report mailed Oct. 26, 2011 in European Application No. 11168534.3.

(Continued)

*Primary Examiner* — Wen Huang
(74) *Attorney, Agent, or Firm* — Foley & Lardner LLP

(57) ABSTRACT

A cellular radio communication system includes a first mobile terminal, a base station that performs radio communication with first mobile terminals, a second mobile terminal, and a second base station that performs radio communication with second mobile terminals. In the downlink communication, the base station selects a high data rate mode when the radio interference from the base station to the second mobile terminals that are located close to an edge of a communication area of the second base station is small. The base station selects an interference mitigation mode in the downlink communication when the radio interference from the base station to the second mobile terminals that are located close to the edge of the communication area of the second base station is large. Thus, inter-cell interference control can be performed in collaboration with base stations in the radio communication system without having communication interface between the base stations.

20 Claims, 28 Drawing Sheets

(56) References Cited

U.S. PATENT DOCUMENTS

| | | | |
|---|---|---|---|
| 2010/0279703 A1* | 11/2010 | Morita et al. | 455/452.2 |
| 2011/0002371 A1* | 1/2011 | Forenza et al. | 375/227 |
| 2011/0003559 A1 | 1/2011 | Morita et al. | |
| 2011/0149732 A1* | 6/2011 | Uzunalioglu et al. | 370/235 |
| 2011/0217974 A1* | 9/2011 | Naka et al. | 455/423 |
| 2011/0275361 A1* | 11/2011 | Yavuz et al. | 455/422.1 |
| 2012/0142334 A1* | 6/2012 | Sato et al. | 455/422.1 |
| 2013/0039206 A1* | 2/2013 | Borran et al. | 370/252 |

FOREIGN PATENT DOCUMENTS

| | | |
|---|---|---|
| JP | 2009/510967 | 3/2009 |
| WO | WO 2008/004299 A1 | 1/2008 |
| WO | WO 2009/122778 A1 | 10/2009 |

OTHER PUBLICATIONS

3GPP Organization Partners; $3^{rd}$ Generation Partnership Project; Technical Specification Group Radio Access Network; Evolved Universal Terrestrial Radio Access Network (E-UTRAN); X2 application protocol (X2AP) (Release 9)—Load Indication; 3GPP TS 36.423 V9.1.0, 8.3.1 (Dec. 2009); pp. 1-114.

* cited by examiner

DOWNLINK MCS TABLE

| MCS INDEX | MODULATION SCHEME | APPROXIMATE CODING RATE |
|---|---|---|
| 0 | QPSK | 0.1056 |
| 1 | QPSK | 0.1444 |
| 2 | QPSK | 0.1778 |
| 3 | QPSK | 0.2278 |
| 4 | QPSK | 0.2833 |
| 5 | QPSK | 0.3500 |
| 6 | QPSK | 0.4167 |
| 7 | QPSK | 0.4944 |
| 8 | QPSK | 0.5611 |
| 9 | QPSK | 0.6500 |
| 10 | 16QAM | 0.3250 |
| 11 | 16QAM | 0.3583 |
| 12 | 16QAM | 0.4139 |
| 13 | 16QAM | 0.4694 |
| 14 | 16QAM | 0.5361 |
| 15 | 16QAM | 0.6028 |
| 16 | 16QAM | 0.6250 |
| 17 | 64QAM | 0.4167 |
| 18 | 64QAM | 0.4463 |
| 19 | 64QAM | 0.4981 |
| 20 | 64QAM | 0.5426 |
| 21 | 64QAM | 0.6019 |
| 22 | 64QAM | 0.6463 |
| 23 | 64QAM | 0.6907 |
| 24 | 64QAM | 0.7500 |
| 25 | 64QAM | 0.8093 |
| 26 | 64QAM | 0.8389 |
| 27 | 64QAM | 0.8685 |
| 28 | 64QAM | 1.0167 |
| 29 | QPSK | — |
| 30 | 16QAM | — |
| 31 | 64QAM | — |

Columns labeled: 2141 (MCS INDEX), 2142 (MODULATION SCHEME), 2143 (APPROXIMATE CODING RATE)

FIG. 29

UPLINK MCS TABLE  215, 315

| MCS INDEX (2151) | MODULATION SCHEME (2152) | APPROXIMATE CODING RATE (2153) |
|---|---|---|
| 0 | QPSK | 0.1056 |
| 1 | QPSK | 0.1444 |
| 2 | QPSK | 0.1778 |
| 3 | QPSK | 0.2278 |
| 4 | QPSK | 0.2833 |
| 5 | QPSK | 0.3500 |
| 6 | QPSK | 0.4167 |
| 7 | QPSK | 0.4944 |
| 8 | QPSK | 0.5611 |
| 9 | QPSK | 0.6500 |
| 10 | QPSK | 0.7167 |
| 11 | 16QAM | 0.3583 |
| 12 | 16QAM | 0.4139 |
| 13 | 16QAM | 0.4694 |
| 14 | 16QAM | 0.5361 |
| 15 | 16QAM | 0.6028 |
| 16 | 16QAM | 0.6250 |
| 17 | 16QAM | 0.6694 |
| 18 | 16QAM | 0.7472 |
| 19 | 16QAM | 0.8139 |
| 20 | 16QAM | 0.9028 |
| 21 | 64QAM | 0.6019 |
| 22 | 64QAM | 0.6463 |
| 23 | 64QAM | 0.6907 |
| 24 | 64QAM | 0.7500 |
| 25 | 64QAM | 0.8093 |
| 26 | 64QAM | 0.8389 |
| 27 | 64QAM | 0.8685 |
| 28 | 64QAM | 0.9278 |
| 29 | — | — |
| 30 | — | — |
| 31 | — | — |

BASE STATION

CLAIM OF PRIORITY

The present application claims priority from Japanese patent application serial no. 2010-128023, filed on Jun. 3, 2010, the content of which is hereby incorporated by reference into this application.

BACKGROUND OF THE INVENTION

The present invention relates to a radio base station device constituting a radio communication system.

Orthogonal Frequency-Division Multiple Access (OFDMA) is a user multiplexing scheme that is often used in radio communications. In OFDMA, simultaneous access of a plurality of mobile terminals (MTs) is realized by assigning some of a large number of subcarriers, which are prepared by the Orthogonal Frequency Division Multiplexing (OFDM) scheme, to the mobile terminals as frequency resources. The OFDMA scheme requires assignment of frequency resources used in data communication before data transmission. In a cellular radio system using the OFDMA scheme, a base station (BS) determines the frequency resource assignment, and notifies each mobile terminal of the frequency resource assignment information through a dedicated control information channel.

In the downlink data transmission from the base station to the mobile terminals, first, the base station assigns frequency resources to each mobile terminal according to the amount of data to be transmitted to the particular mobile terminal, and the like. Each mobile terminal is notified by the base station of the frequency resource assignment information through the control information channel, at the same time as the data transmission or prior to the data transmission. The base station transmits data by using the frequency resources assigned to each mobile terminal. The mobile terminal receiving the data from the base station, determines which frequency resources are used for the data transmission, according to the frequency resource assignment information from the base station. Then, the particular mobile terminal receives the data based on the frequency resources determined as described above.

Further, in the uplink data transmission from the mobile terminals to the base station, first, each mobile terminal notifies the base station of a data transmission request and information on the desired data amount to be transmitted. The base station assigns frequency resources to each mobile terminal based on the notification, such as the data transmission request, from the particular mobile terminal. Each mobile terminal is notified by the base station of the frequency resource assignment information through the control information channel. Then, each mobile terminal determines which frequency resources should be used for the data transmission, and transmits data based on the frequency resources determined as described above. The base station receives the data by using the frequency resources assigned to each mobile terminal.

As described above, OFDMA can realize data communication with adaptive bandwidth assignment according to the amount of data to be transmitted, by sharing the information on the frequency resource assignment determined by the base station to the individual mobile terminals, between the base station and the individual mobile terminals.

In the cellular radio system using OFDMA, different frequency resources are assigned based on the mechanism described above. Thus, in general, there is no interference between the mobile terminals that communicate with the same base station. Rather, inter-cell interference is dominant in the environment in which the same frequency resource is assigned to mobile terminals that communicate with a plurality of neighboring base stations, respectively. For this reason, the OFDMA system requires a mechanism for controlling the inter-cell interference.

Fractional Frequency Reuse (FFR) is being studied as an inter-cell interference control scheme in the OFDMA system. In FFR, the inter-cell interference is reduced by dividing the frequency band into a plurality of subbands, and by using different subbands between neighboring base stations or changing the transmission power assignment pattern for each subband between neighboring base stations. The implementation of the FFR technology is described in JP-A No. 510967/2009 and in International Publication No. WO 08/004,299.

In the standardization body 3GPP, radio communication systems using OFDMA and Discrete Fourier Transform-Spread (DFT-S)-OFDMA are standardized as Evolved Universal Terrestrial Radio Access (E-UTRA) and Evolved Universal Terrestrial Radio Access Network (E-UTRAN). Further, 3GPP TS 36.423 V9.1.0, 8.3.1 Load Indication provides an inter-base station (BS) interface X2 to support the inter-cell interference control by FFR, and the like, in collaboration with the neighboring base stations. The inter-BS interface X2 exchanges information about the transmission power, and the like, between base stations.

In the inter-BS interface X2, downlink transmission power information called Relative Narrowband Transmit Power Indication (RNTP) is exchanged between base stations in the smallest unit of frequency resource assignment called a resource block (RB). Each base station learns in which frequency the transmission power of the neighboring base station is large, by using RNTP notified by the neighboring base station. In the frequency in which the transmission power of the neighboring base station is large, in general, the received interference power of the mobile terminal that communicates with the own base station is large. Further, in general, the mobile terminal that is located close to the cell edge is closer to the neighboring base station than the mobile terminal that is located close to the cell center. Thus, the downlink interference power tends to be higher in the mobile terminal that is located close to the cell edge.

Further, in the inter-BS interface X2, the interference information received by a base station in the uplink is exchanged between base stations as an interference overload indication (OI). OI contains the received interference power information of the base station in each RB. Furthermore, in the inter-BS interface X2, the information about sensitivity to the uplink interference is exchanged between base stations as a high interference indication (HII). HII contains information about RB which is not desired to be used for cell-edge mobile terminals in nearby cells. In general, a mobile terminal that is located in the cell edge of a base station, and a mobile terminal that is located in the cell edge of the neighboring base station, can be highly interactive interference sources.

In E-UTRA and E-UTRAN, the communication interface between base stations called the inter-BS interface X2 is used to exchange subcarrier assignment information in each base station as well as transmission power information.

However, the inter-BS interface X2 is not necessarily supported between all installed base stations. For example, in E-UTRA and E-UTRAN, a base station with a relatively small communication area, which is called a femto-cell (Home eNB), does not support the inter-BS interface X2. In such a case, the inter-cell interference control is not likely to be provided in collaboration between base stations. As a result, the throughput is reduced due to inter-cell interference.

When a new femto-cell BS is installed within the communication area in which a macro-cell BS has been installed for improving the area quality, etc., it is desirable that the presence of the femto-cell BS has no influence on the communication quality in the existing macro-cell BS that has been installed based on the communication area design. However, due to interference given by the newly installed femto-cell BS, the state of the interference of the existing macro-cell BS is changed. As a result, the communication quality is unstable in the existing macro-cell BS. Or, the communication quality is unstable in the newly installed femto-cell BS due to the interference from the existing macro-cell BS.

SUMMARY OF THE INVENTION

In order to solve the problem, a base station assigns communication resources and sets transmission power and coding modulation scheme, so as to independently suppress the active-interference and passive-interference, without using information exchanged between base stations, such as parameters of the inter-BS interface X2.

In order to realize the foregoing, a femto-cell BS determines the magnitude of the influence of interference given by the femto-cell BS to a macro-cell MT that communicates with a macro-cell BS.

Further, when the interference is large, the femto-cell BS assigns frequency resources distributed in the frequency domain for downlink data communication. In this way, the influence of interference received by the macro-cell BS is distributed. The degradation of communication quality can be suppressed in the macro-cell. As a result, the problem can be solved.

Alternatively, when the interference is large, the femto-cell BS applies frequency hopping to perform downlink data communication. In this way, the influence of interference received by the macro-cell MT is distributed. The degradation of communication quality can be suppressed in the macro-cell. As a result, the problem can be solved.

Alternatively, when the interference is large, the femto-cell BS uses a low power spectrum density (PSD) to perform downlink data communication. Further, in order to compensate the influence of the reception quality degradation in the femto-cell MT due to the reduced power spectrum density, the femto-cell BS performs the downlink data communication by increasing the amount of used frequency resources, using a low order modulation scheme or using a low coding rate of forward error correction (FEC). Furthermore, in order to compensate for the influence of the reception quality degradation in the femto-cell MT due to the reduced power spectrum density, the femto-cell BS applies a transmit diversity using Space-Time Block Code (STBC), and the like, to the downlink data communication. This makes it possible to reduce the interference power received by the macro-cell MT, and to suppress the degradation of communication quality in the macro-cell, while suppressing the degradation of communication quality in the femto-cell. As a result, the problem can be solved.

Further, in order to realize the foregoing, the femto-cell BS determines the magnitude of the influence of interference to the femto-cell BS from the macro-cell MT that communicates with the macro-cell BS.

Further, when the interference is large, the femto-cell BS assigns frequency resources distributed in the frequency domain, for the uplink data communication. This makes it possible to distribute the influence of interference received by the femto-cell BS, and to suppress the degradation of communication quality in the femto-cell. As a result, the problem can be solved.

Alternatively, when the interference is large, the femto-cell BS applies frequency hopping to the frequency resources assigned to the uplink data communication. This makes it possible to distribute the influence of interference received by the femto-cell BS, and to suppress the degradation of communication quality in the femto-cell. As a result, the problem can be solved.

Alternatively, when the interference is large, the femto-cell BS increases the termination target of hybrid ARQ retransmission in the uplink data communication. The increased number of hybrid ARQ retransmissions absorbs the influence of the time variation of the interference power. Thus a stable communication quality is realized in the femto-cell. As a result, the problem can be solved.

Alternatively, when the interference is large, the femto-cell BS sets a high transmission power spectrum density to the femto-cell MT. Further, in order to take advantage of the reception quality improvement in the femto-cell BS due to the increased power spectrum density, the femto-cell BS instructs the femto-cell MT to perform the uplink data communication by reducing the amount of used frequency resources, using a high order modulation scheme or using high coding rate of forward error correction. This increases the received power spectrum density of the uplink received signal in the femto-cell BS, while reducing the amount of frequency resources that can give interference to the macro-cell. The interference power received by the femto-cell BS is reduced in comparison with the received signal power that is received by the femto-cell BS. Thus, the degradation of communication quality in the femto-cell is suppressed. As a result, the problem can be solved.

According to the present invention, the radio communication quality is improved by preventing the occurrence of interference between the femto-cell and the macro-cell, to contribute to the increased efficiency in the use of the radio resource.

BRIEF DESCRIPTION OF THE DRAWINGS

Preferred embodiments of the present invention will now be described in conjunction with the accompanying drawings, in which;

FIG. 20 is a diagram showing an MCS table used in downlink;

FIG. 29 is a diagram showing an MCS table used in uplink; and

DETAILED DESCRIPTION OF THE PREFERRED EMBODIMENTS

Figure 1:
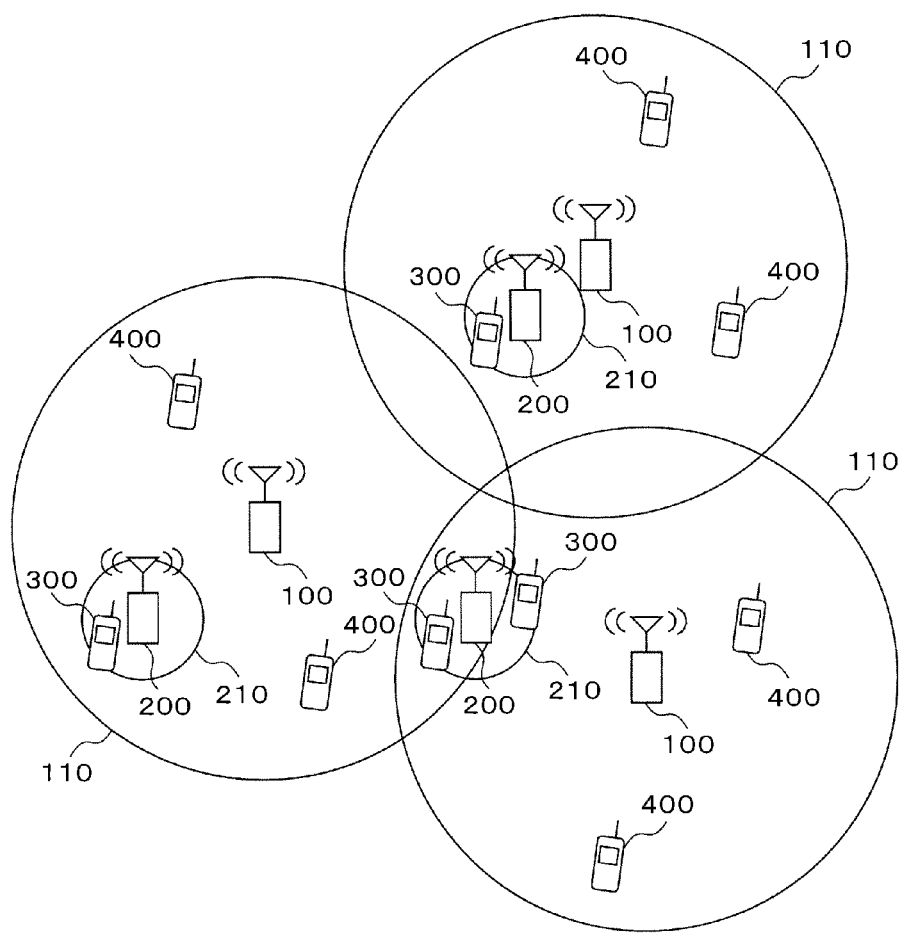
FIG. 1 is a diagram showing an arrangement of macro-cell and femto-cell.

In the following description of embodiments, one embodiment will be divided into a plurality of sections or embodiments if necessary for convenience. However, they are not independent of each other but are in such relation that one is a modification to or the details, supplementary explanation, or the like of part or all of another, unless it is clearly stated otherwise. In cases where a number of elements (including a number of pieces, numeric value, quantity, range, and the like) is cited in the following description of embodiments, the present invention is not limited to that specific number. Any number greater or less than that specific number is acceptable. However, this does not apply when otherwise stated, when the invention is obviously limited to that specific number according to the principle, or in other like cases.

Further, in the following description of embodiments, it goes without saying that the components (including element step and the like) are not necessarily required. However, this does not apply when otherwise stated, when it is considered to be clearly required according to the principle, or in other like cases. Similarly, in cases where the form of components, positional relationship, and the like, are cited in the following description of embodiments, those substantially approximate or similar to the form or other features should be included. However, this does not apply when otherwise stated, when it is apparently considered not to be so according to the principle, or in other like cases. This is the same for the numerical value and the range.

Hereinafter, embodiments will be described in detail with reference to the accompanying drawings. In principle, like parts are designated by like reference numerals throughout the drawings showing embodiments, and the explanation is not repeated.

A cellular radio communication system to which the embodiments are applied will be described in detail with reference to the drawings, using E-UTRA/E-UTRAN as an example. Note that in the following description, it is assumed that a new base station (femto-cell BS) is installed in the communication area of an existing base station (macro-cell BS).

The arrangement of macro-cell BS and femto-cell BS will be described with reference to FIG. 1. In FIG. 1, a macro-cell BS 100 constitutes a macro-cell 110 with the communication range thereof. The macro-cell BS 100 is wirelessly connected to a mobile terminal 400. A femto-cell BS 200 constitutes a femto-cell 210 with the communication range thereof. The femto-cell BS 200 is wirelessly connected to a mobile terminal 300. In this specification, the mobile terminal 400 connected to the macro-cell BS 100 is called macro-cell MT, and the mobile terminal 300 connected to the femto-cell BS 200 is called femto-cell MT.

Figure 2:
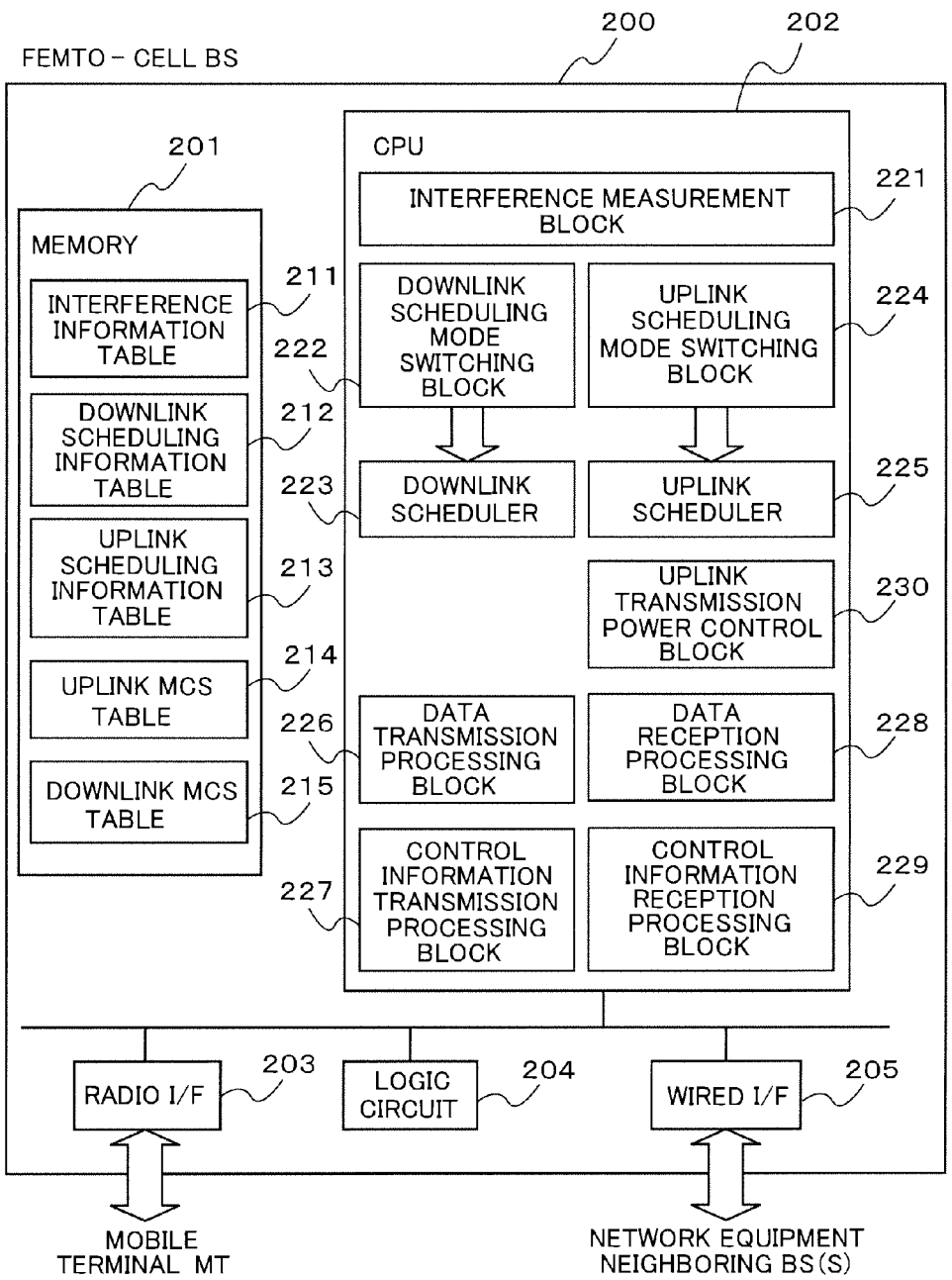
FIG. 2 is a block diagram of a femto-cell BS.

The configuration of the femto-cell BS 200 will be described with reference to FIG. 2. In FIG. 2, the femto-cell BS 200 includes a memory 201, a CPU 202, a radio I/F 203, a logic circuit 204, and a wired I/F 205. The radio I/F 203 performs transmission and reception of radio signals with mobile terminals. The logic circuit 204 performs forward error correction coding and the like. The wired I/F 205 performs communication with a network device and neighboring base stations.

The memory 201 includes an interference information table 211, a downlink scheduling information table 212, an uplink scheduling information table 213, a downlink modulation and coding scheme (MCS) table 214, and an uplink MCS table 215. The interference information table 211 stores the reference signal power and pathloss information. The downlink scheduling information table 212 stores scheduling results in the downlink. The uplink scheduling information table 213 stores scheduling results in the uplink. The downlink MCS table 214 is used for downlink data transmission. The uplink MCS table 215 is used for uplink data reception.

The CPU 202 executes a program. The CPU 202 includes an interference measurement block 221, a downlink scheduling mode switching block 222, a downlink scheduler 223, an uplink scheduling mode switching block 224, an uplink scheduler 225, a data transmission processing block 226, a control information transmission processing block 227, a data reception processing block 228, a control information reception processing block 229, and an uplink transmission power control block 230.

The interference measurement block 221 measures the received interference level of the uplink. The downlink scheduler 223 determines the frequency resource assignment, MCS, and the like for data transmission in the downlink. The uplink scheduler 225 determines the frequency resource assignment, MCS, and the like for data transmission in the uplink. The data transmission processing block 226 processes data to be transmitted to mobile terminals. The control information transmission processing block 227 processes control information to be transmitted to mobile terminals, such as scheduling result and uplink data decoding result (ACK/NACK) with respect to each mobile terminal. The data reception processing block 228 processes data received from mobile terminals. The control information reception processing block 229 processes control information, such as downlink data decoding results (ACK/NACK), received from each mobile terminal. The uplink transmission power control block 230 controls the transmission power of each mobile terminal.

Figure 3:
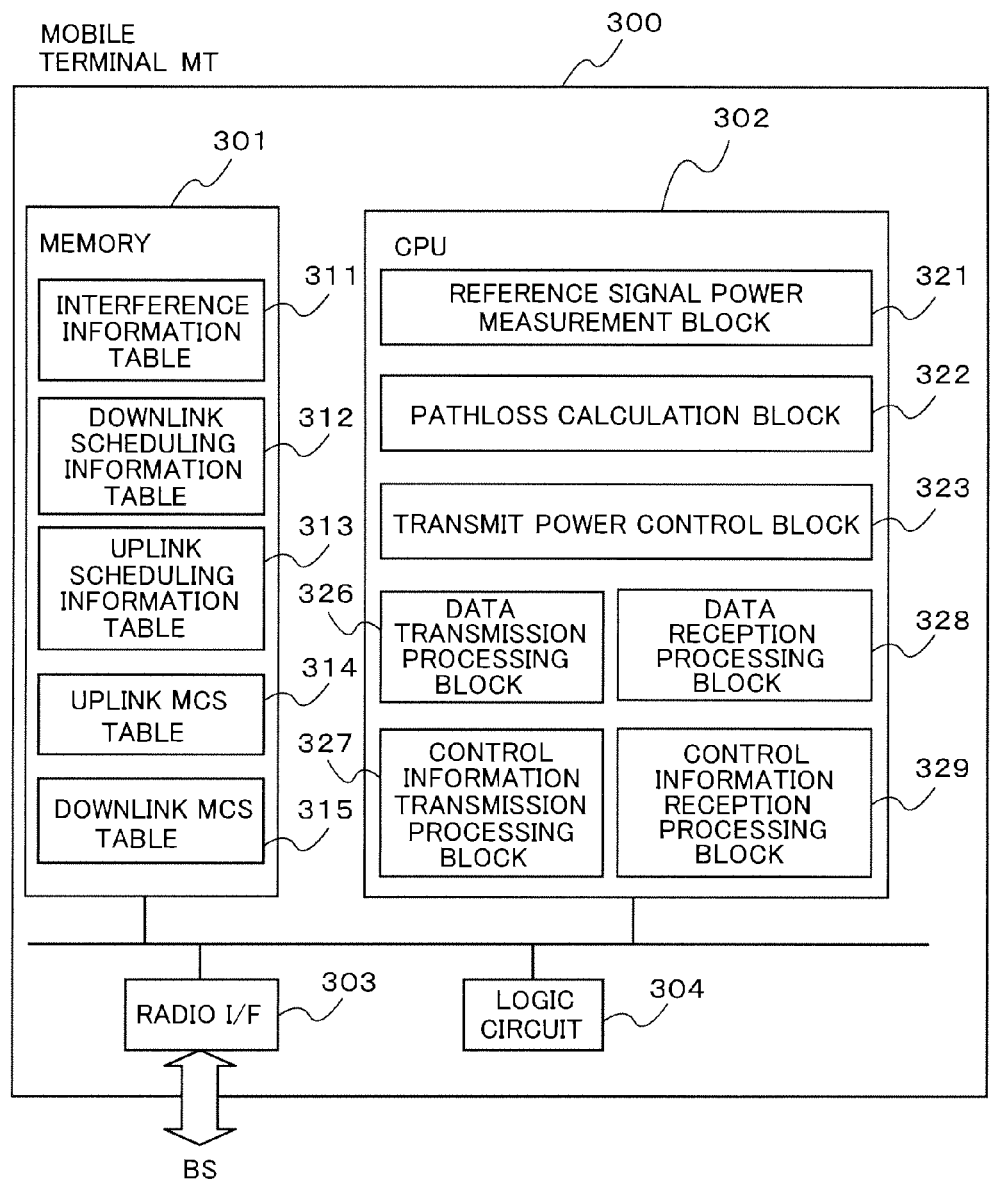
FIG. 3 is a block diagram of a mobile terminal.

The configuration of the femto-cell MT 300 will be described with reference to FIG. 3. In FIG. 3, the femto-cell MT 300 includes a memory 301, a CPU 302, a radio I/F 303, and a logic circuit 304. The radio I/F 303 performs transmission and reception of radio signals with a base station. The logic circuit 304 performs forward error correction coding and the like.

The memory 301 includes an interference information table 311, a downlink scheduling information table 312, an uplink scheduling information table 313, a downlink MCS table 314, and an uplink MCS table 315. The interference information table 311 stores the reference signal power and pathloss information measured by the femto-cell MT 300. The downlink scheduling information table 312 stores the scheduling result of the particular mobile terminal in the downlink. The uplink scheduling information table 313 stores the scheduling result of the particular mobile terminal in the uplink. The downlink MCS table 314 is used for downlink data reception. The uplink MCS table 315 is used for uplink data transmission.

The CPU 302 includes a reference signal power measurement block 321, a pathloss calculation block 322, a transmission power control block 323, a data transmission processing block 326, a data reception processing block 328, and a control information reception processing block 329.

The reference signal power measurement block 321 calculates the received power level of the reference signal (RS) from the base station. The pathloss calculation block 322 calculates the attenuation of radio signal in radio channel (pathloss) from the base station to the particular mobile terminal in the downlink. The transmission power control block 323 controls the transmission power of the uplink signal transmitted from the mobile terminal to the base station. The data transmission processing block 326 processes data to be transmitted to the base station. The control information transmission processing block 327 processes control information to be transmitted to the base station, such as downlink data decoding result (ACK/NACK). The data reception processing block 328 processes data received from the base station. The control information reception processing block 329 processes control information received from the base station, such as scheduling result and uplink data decoding result (ACK/NACK) with respect to the particular mobile terminal.

In the base station arrangement shown in FIG. 1, the influence of interference is different depending on the installation location of the femto-cell BS 200 with respect to the macro-cell BS 100. First, the influence of interference in the downlink will be described with reference to FIGS. 4 and 5.

Figure 4:
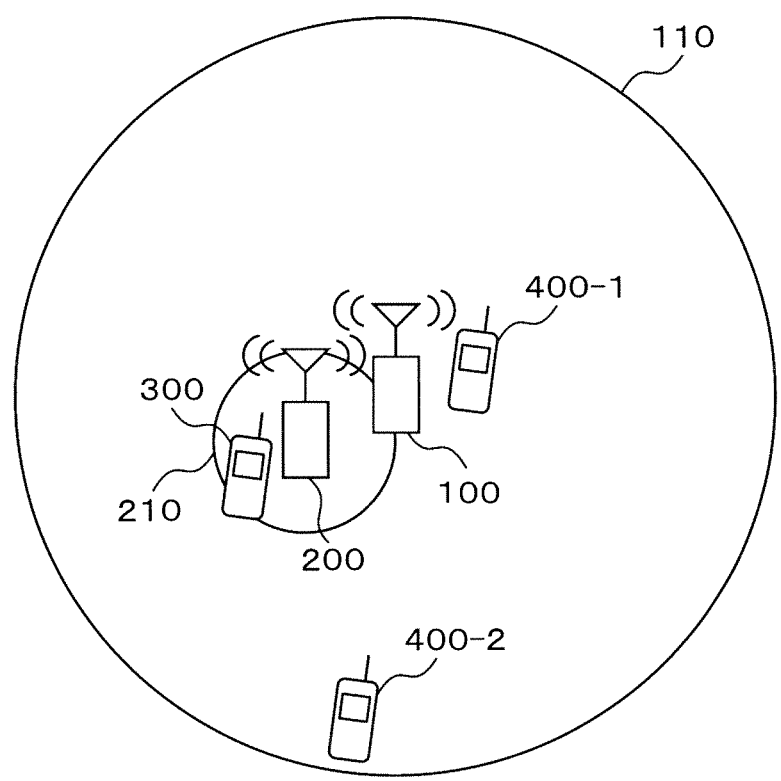
FIG. 4 is a diagram showing an arrangement of the femto-cell BS.

FIG. 4 shows the arrangement in which the femto-cell BS 200 is located close to the macro-cell BS 100. Referring to FIG. 4, there is shown the influence of interference received by a macro-cell MT 400-1 that is located close to the cell center, a macro-cell MT 400-2 that is located close to the cell edge, and the femto-cell MT 300.

In FIG. 4, the macro-cell MT 400-1, which is located close to the cell center, is in the vicinity of the femto-cell BS 200. Thus, the interference power from the femto-cell BS 200 is relatively large. However, the macro-cell MT 400-1 is in the vicinity of the macro-cell BS 100. Thus, the received signal power in the macro-cell MT 400-1 from the macro-cell BS 100 is sufficiently large. For this reason, it is considered that the index of communication quality called Signal-to-Interference and Noise Ratio (SINR) may not be significantly degraded.

The macro-cell MT 400-2, which is located close to the cell edge, is located far from the macro-cell BS 100. Thus, the received signal power from the macro-cell BS 100 is relatively small in the macro-cell MT 400-2 that is located close to the cell edge. However, the macro-cell MT 400-2 is located far from the femto-cell BS 200. Thus, the interference power from the femto-cell BS 200 is small in the macro-cell MT 400-2 that is located close to the cell edge. For this reason, it is considered that SINR may not be significantly degraded.

The femto-cell MT 300 is in the vicinity of the macro-cell BS 100. Thus, the interference power from the macro-cell BS 100 is relatively large. However, the femto-cell MT 300 is also located in the vicinity of the femto-cell BS 200. Thus, the received signal power from the femto-cell BS 200 is sufficiently large. For this reason, it is considered that SINR may not be significantly degraded.

Figure 5:
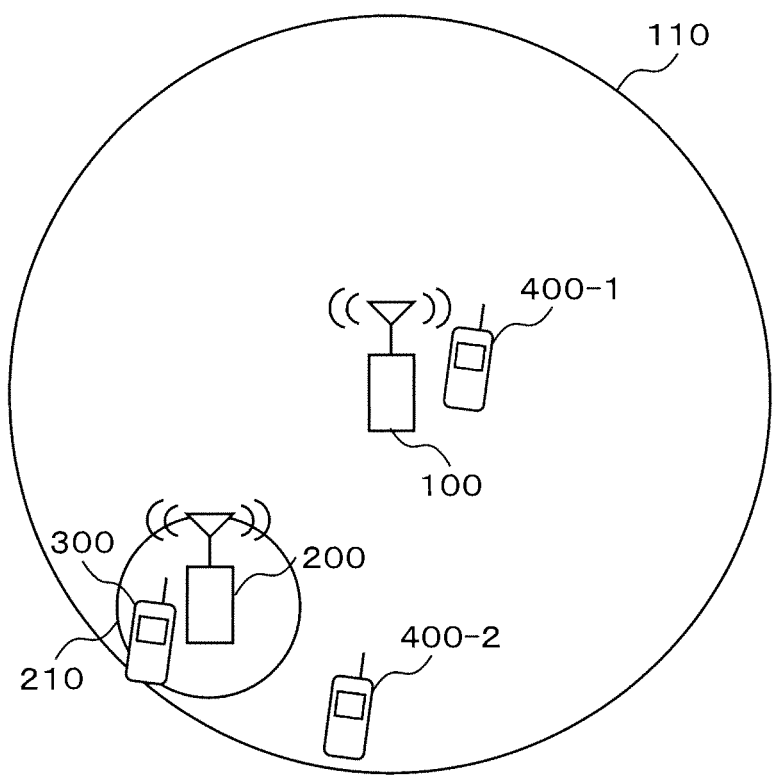
FIG. 5 is a diagram showing another arrangement of the femto-cell BS.

FIG. 5 shows the arrangement in which the femto-cell BS 200 is installed close to the cell edge. Referring to FIG. 5, there is shown the influence of interference received by the macro-cell MT 400-1 that is located close to the cell center, the macro-cell MT 400-2 that is located close to the cell edge, and the femto-cell MT 300.

The macro-cell MT 400-1, which is located close to the cell center, is in the vicinity of the macro-cell BS 100. Thus, the received signal power from the macro-cell BS 100 is sufficiently large. Further, the macro-cell MT 400-1 is located far from the femto-cell BS 200. Thus, the interference power from the femto-cell BS 200 is relatively small. For this reason, it is considered that SINR is large and the communication quality is good.

The macro-cell MT 400-2, which is located close to the cell edge, is located far from the macro-cell BS 100. Thus, the received signal power from the macro-cell BS 100 is relatively small. Further, the macro-cell MT 400-2 is located in the vicinity of the femto-cell BS 200. Thus, the interference power from the femto-cell BS 200 is large. For this reason, it is considered that SINR is significantly degraded.

The femto-cell MT 300 is located in the vicinity of the femto-cell BS 200. Thus, the received signal power from the femto-cell BS 200 is sufficiently large. Further, the femto-cell MT 300 is located far from the macro-cell BS 100. Thus, the interference power from the macro-cell BS 100 is relatively small. For this reason, it is considered that SINR is large and the communication quality is good.

As described above, the interference from the femto-cell BS to the macro-cell MT has a great influence on the communication quality in the downlink. Thus, in this embodiment, the scheduling mode in the femto-cell BS to perform the downlink data transmission to the femto-cell MT is switched according to the interference given to the macro-cell MT. In other words, when the interference given by the femto-cell BS to the macro-cell MT that is located close to the cell edge is large, the femto-cell BS selects interference mitigation mode as the downlink scheduling mode. Further, when the interference given by the femto-cell BS to the macro-cell MT that is located close to the cell edge is small, the femto-cell BS selects high data rate mode as the downlink scheduling mode. The scheduling mode will be described in detail below.

In the femto-cell BS, the determination of the magnitude of the interference to the macro-cell MT that is located close to the cell edge can be performed based on the passive interference level measured by the macro-cell MT. In other words, the macro-cell MT notifies the femto-cell BS of the measured interference level from the femto-cell BS. Then, the femto-cell BS determines the downlink scheduling mode based on the magnitude of the interference level notified by the macro-cell MT.

However, in order to notify the femto-cell BS of the interference level as described above, the macro-cell MT must be connected to the femto-cell BS, or the macro-cell MT notifies the macro-cell BS of the interference level which is then forwarded to the femto-cell BS from the macro-cell BS. Thus, there is a method for determining the state of the interference from the femto-cell BS to the macro-cell MT, without reporting the interference level from the macro-cell MT to the femto-cell BS, which will be described with reference to FIGS. 6, 7, 8, 9, and 10.

Figure 6:
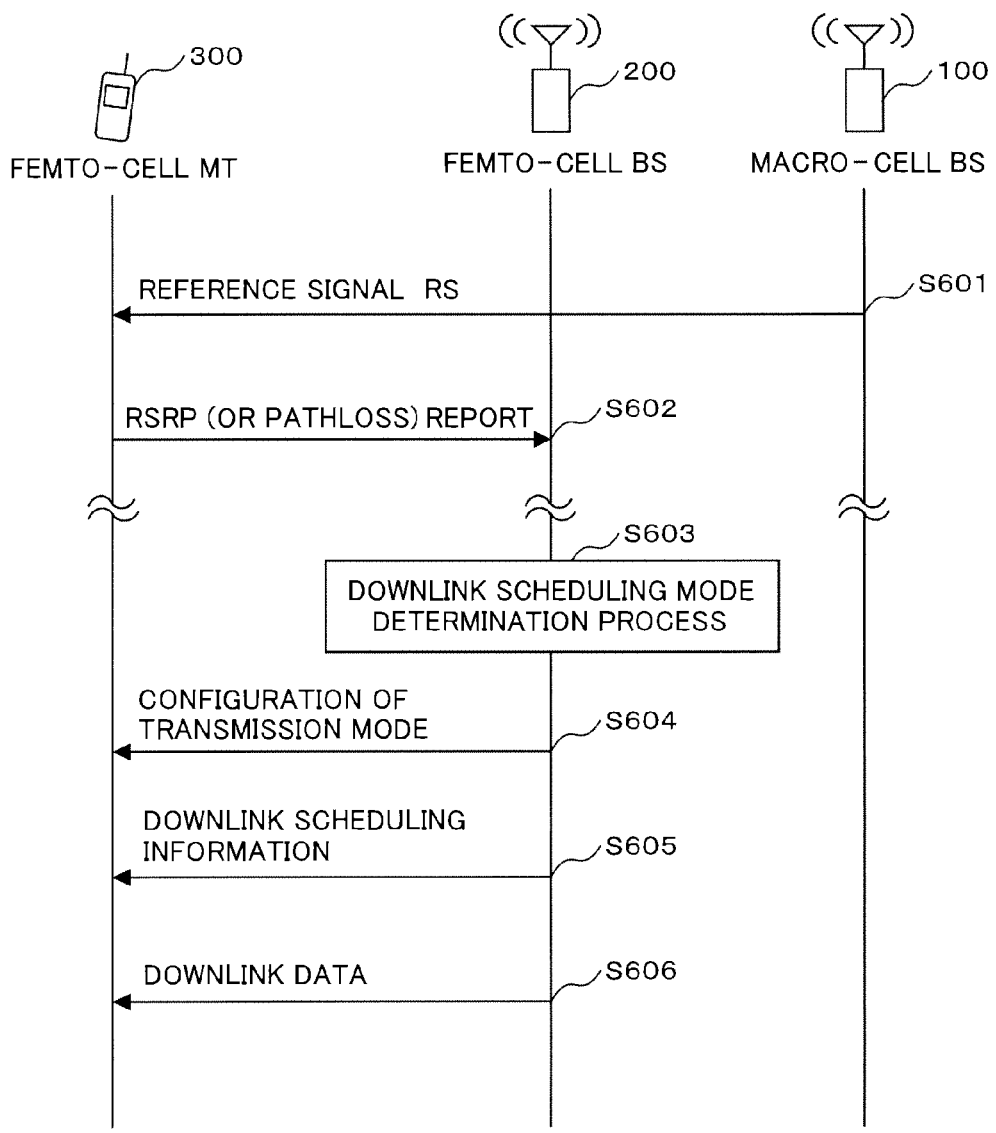
FIG. 6 is a sequence diagram of the procedure for determining the state of the interference given to the macro-cell MT.
Figure 7:
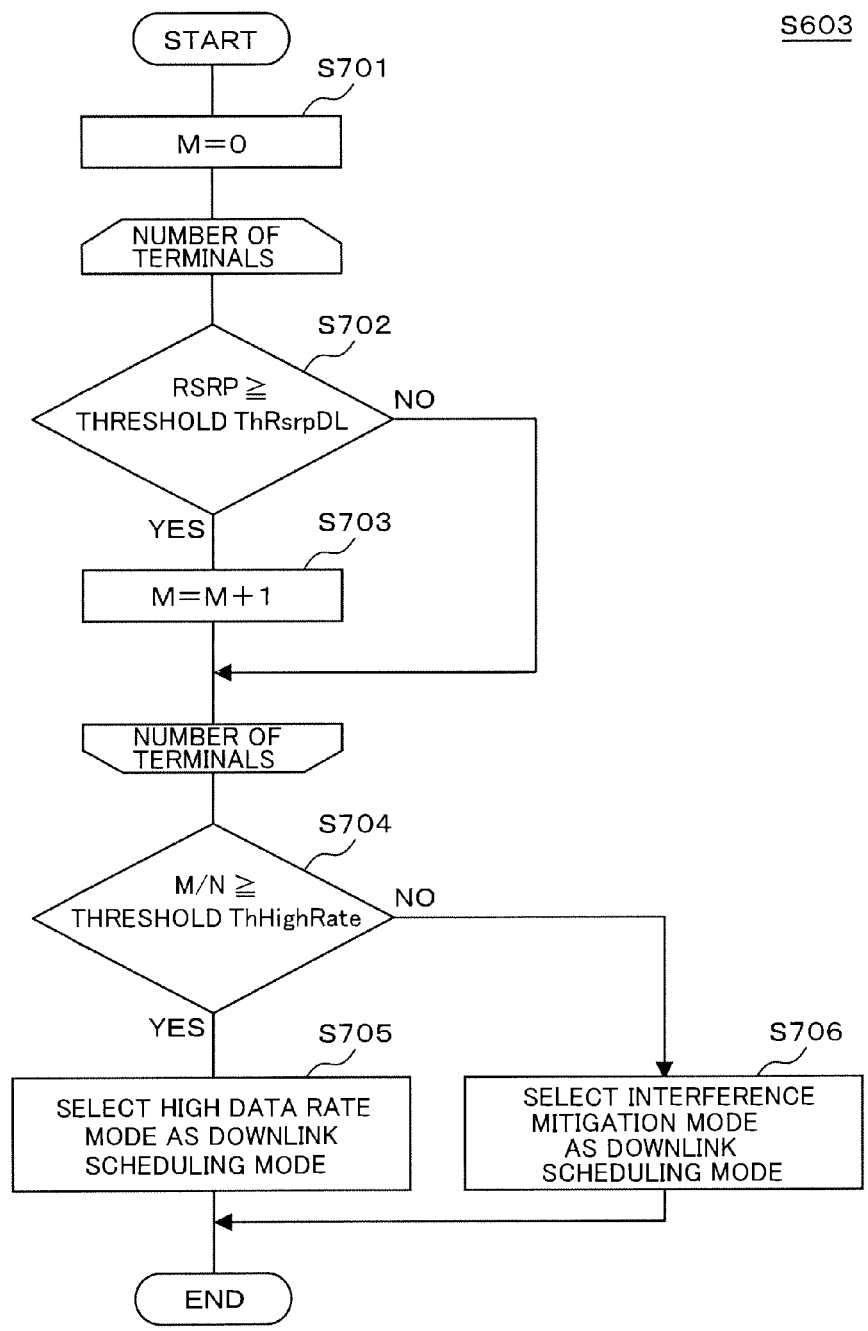
FIG. 7 is a flow chart of the process of selecting a downlink scheduling mode.
Figure 8:
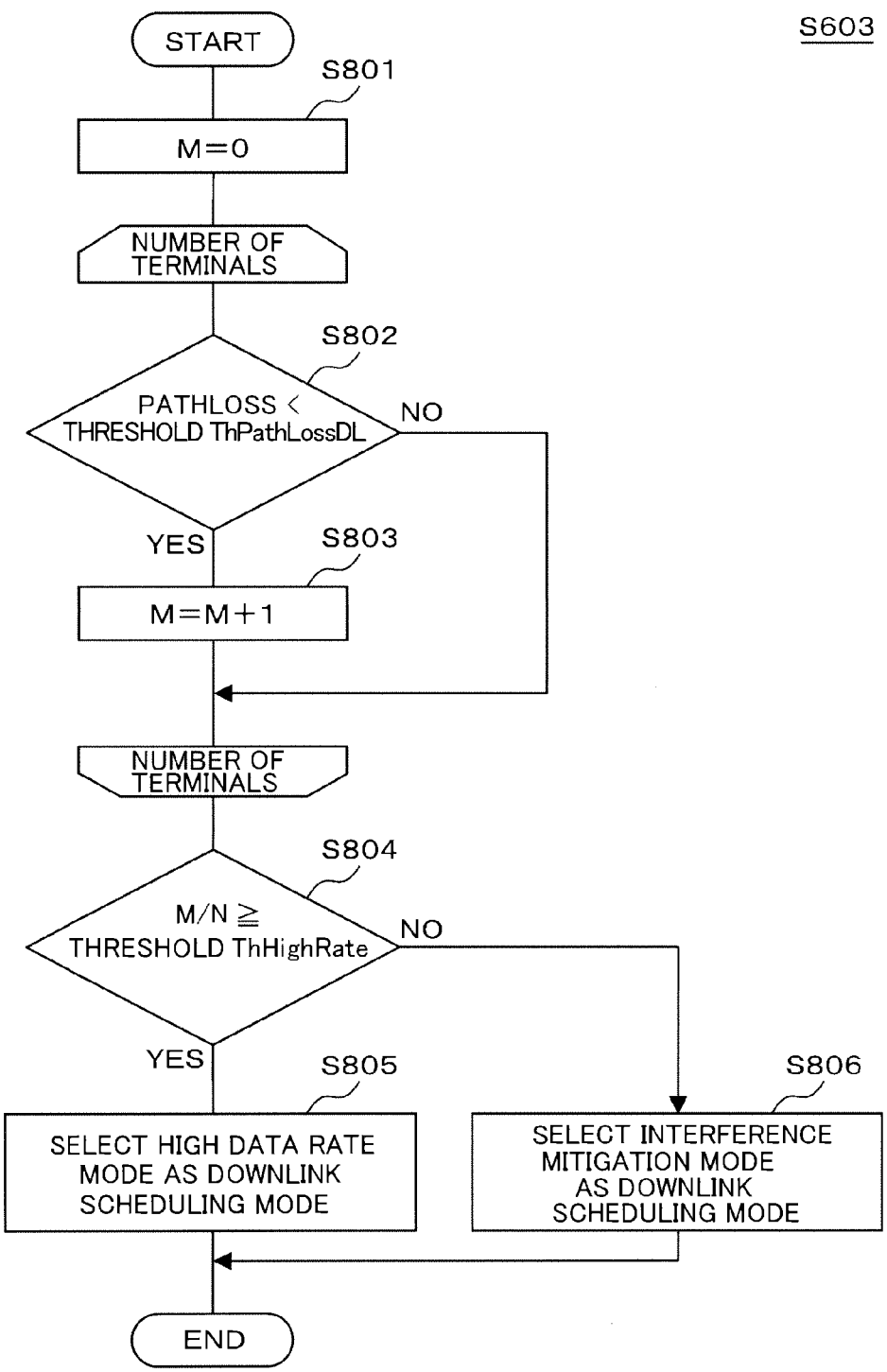
FIG. 8 is a flow chart of the process of selecting a downlink scheduling mode.
Figure 9:
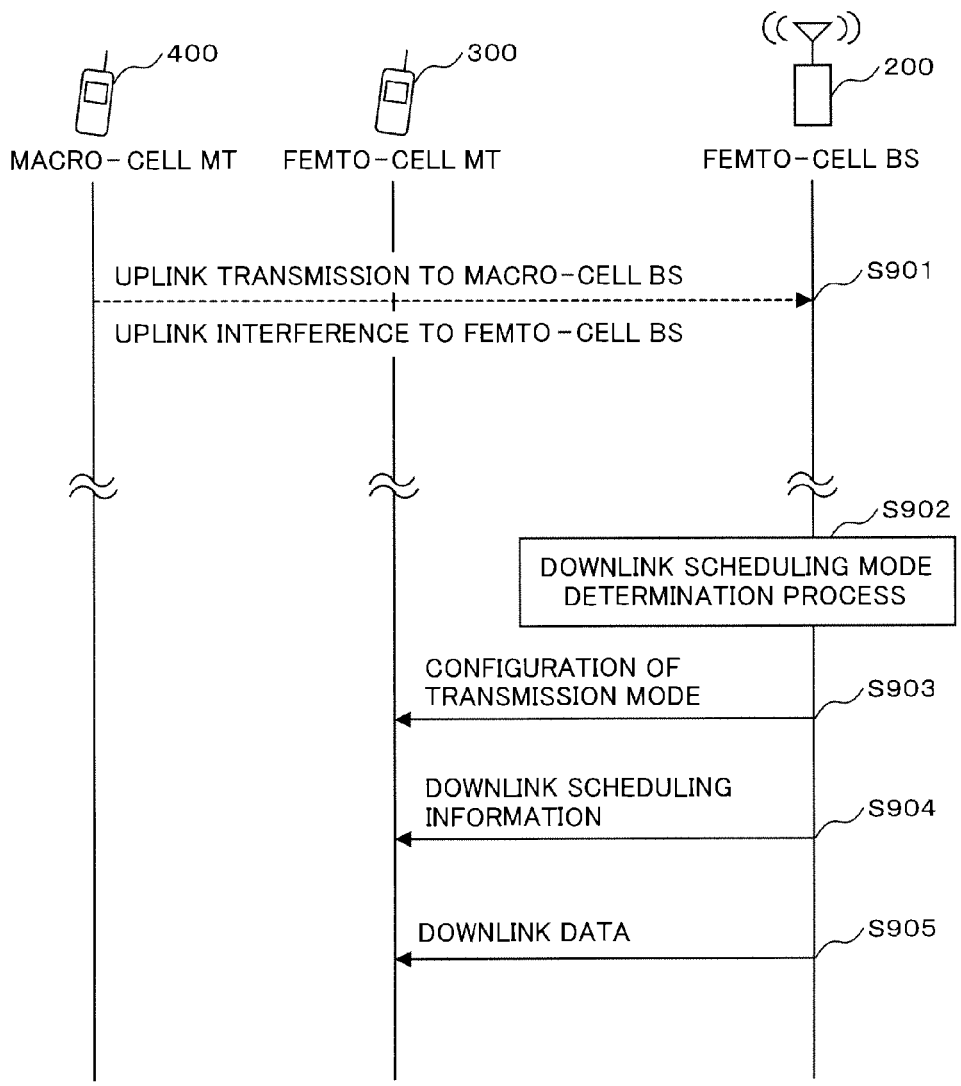
FIG. 9 is a sequence diagram of the procedure for determining the state of the interference given to the macro-cell MT.

Here, FIGS. 6 and 9 show the sequence for determining the downlink scheduling mode. FIGS. 7, 8, and 9 show the process for determining the downlink scheduling mode.

Referring to FIG. 6, there is shown the procedure for determining the state of the interference from the femto-cell BS to the macro-cell MT, by using the information notified by the femto-cell MT to the femto-cell BS. In FIG. 6, the macro-cell BS 100 transmits a reference signal (RS) (S601). The femto-cell MT 300 causes the reference signal power measurement block 321 to calculate the reference signal received power (RSRP) that is received through the radio I/F 303. Alternatively, the femto-cell MT 300 causes the pathloss calculation block 322 to calculate the pathloss between the macro-cell BS 100 and the femto-cell MT 300, by using the received reference signal received power and the reference signal transmission power of the macro-cell BS 100. Next, the femto-cell MT 300 notifies the femto-cell BS 200 of the RSRP or pathloss (S602).

The femto-cell BS 200 stores the RSRP or pathloss information notified by N (N is 1 or more) femto-cell MTs 200 into the interference information table 211. The femto-cell BS 200 causes the downlink scheduling switching block 222 to determine the downlink scheduling mode by using the RSRP or pathloss information (S603). Then, the femto-cell BS 200 sets the configuration for the data transmission in the downlink if necessary (S604). The femto-cell BS 200 transmits the resource assignment information for the downlink data transmission, as downlink scheduling information, to the femto-cell MT 300 (S605). The femto-cell BS 200 transmits the downlink data to the femto-cell MT 300 (S606).

Referring to FIG. 7, there is shown the flow of the downlink scheduling mode determination step 603 that is performed by the downlink scheduling mode switching block 222 of the femto-cell BS 200 based on RSRP. In FIG. 7, first the downlink scheduling mode switching block 222 initializes the number of mobile terminals M, in order to count the number of mobile terminals M with RSRP exceeding a predetermined RSRP threshold (S701). If there is a mobile terminal with RSRP equal to or greater than a threshold ThRsrpDL (YES in S702), the downlink scheduling mode switching block 222 adds 1 to the number of mobile terminals M (S703). The processes of step 702 and step 703 are performed with respect to N femto-cell MTs that have notified the femto-cell BS 200 of RSRP.

Then, if the ratio of the number of mobile terminals with RSRP exceeding the threshold ThRsrpDL to the number of femto-cell MTs that have notified the femto-cell BS 200 of RSRP, M/N, is equal to or greater than a predetermined threshold ThHighRate (YES in S704), the downlink scheduling mode switching block 222 determines that the femto-cell MT 300 and the femto-cell BS 200 are located close to the cell center as shown in FIG. 4. The downlink scheduling mode switching block 222 selects the high data rate mode as the downlink scheduling mode (S705).

On the other hand, if M/N is less than the threshold ThHighRate (NO in S704), the downlink scheduling mode switching block 222 determines that the femto-cell MT 300 and the femto-cell BS 200 are located close to the cell edge as shown in FIG. 5. The downlink scheduling mode switching block 222 selects the interference mitigation mode as the downlink scheduling mode (S706).

Referring to FIG. 8, there is shown the flow of the downlink scheduling mode determination step 603 that is performed by the downlink scheduling mode switching block 222 of the femto-cell BS 200 based on pathloss. In FIG. 8, first the downlink scheduling mode switching block 222 initializes the number of mobile terminals M, in order to count the number of mobile terminals M with pathloss exceeding a predetermined threshold (S801). If there is a mobile terminal with pathloss less than a threshold ThPathLossDL (YES in S802), the downlink scheduling mode switching block 222 adds 1 to the number of mobile terminals M (S803). The processes of step 802 and step 803 are performed with respect to N femto-cell MTs that have notified the femto-cell BS of pathloss.

Then, if the ratio of the number of mobile terminals with pathloss less than the threshold ThPathLossDL, to the number of femto-cell MTs that have notified the femto-cell BS of pathloss, M/N, is equal to or greater than the threshold ThHighRate (YES in S804), the downlink scheduling mode switching block 222 determines that the femto-cell MT 300 and the femto-cell BS 200 are located close to the cell center as shown in FIG. 4. The downlink scheduling mode switching block 222 selects the high data rate mode as the downlink scheduling mode (S805).

On the other hand, if M/N is less than the threshold ThHighRate (NO in S804), the downlink scheduling mode switching block 222 determines that the femto-cell MT 300 and the femto-cell BS 200 are located close to the cell edge as shown in FIG. 5. The downlink scheduling mode switching block 222 selects the interference mitigation mode as the downlink scheduling mode (S806).

In FIGS. 6, 7, and 8, the downlink scheduling mode is determined based on RSRP or pathloss with respect to a single macro-cell BS. However, the downlink scheduling mode may also be determined based on RSRP or pathloss with respect to a plurality of macro-cell BSs.

In FIGS. 6, 7, and 8, the femto-cell MT 300 measures RSRP or pathloss. However, the femto-cell BS 200 may perform the downlink reception function and measurement of RSRP or pathloss.

In FIG. 7, the downlink scheduling mode is selected by using RSRP with respect to the macro-cell. However, the relative value of RSRP with respect to the macro-cell, to RSRP with respect to the femto-cell may also be used as the selection criterion.

In FIG. 8, the downlink scheduling mode is determined based on the pathloss that is notified by the femto-cell MT 300 to the femto-cell BS 200. However, it is also possible to determine the downlink scheduling mode, by using the pathloss calculated by the femto-cell BS 200 using the RSRP that is notified by the femto-cell MT 300 to the femto-cell BS 200, and using the reference signal transmission power of the macro-cell BS 100.

Referring to FIG. 9, there is shown the procedure for determining the state of the interference to the macro-cell MT from the femto-cell BS, based on the uplink interference information measured by the femto-cell BS. In FIG. 9, the macro-cell MT 400 performs an uplink transmission to the macro-cell BS 100 (S901). The uplink transmission by the macro-cell MT 400 is received as interference by the femto-cell BS 200. The femto-cell BS 200 causes the interference measurement block 221 to calculate the interference power level from a plurality of macro-cell MTs 400 for each of the divided frequency blocks of the used frequency band. Here, it is desirable that the frequency block is a resource block (RB) which is the smallest unit of the frequency resource assignment in E-UTRA.

The femto-cell BS 200 causes the downlink scheduling mode switching block 222 to determine the downlink scheduling mode by using the calculated interference power level from the macro-cell MT 400 (S902). Then, the femto-cell BS 200 sets the configuration for the downlink data transmission if necessary (S903). The femto-cell BS 200 transmits the resource assignment information for the downlink data transmission, as downlink scheduling information, to the femto-cell MT 300 (S904). The femto-cell BS 200 transmits the downlink data to the femto-cell MT 300 (S905).

Figure 10:
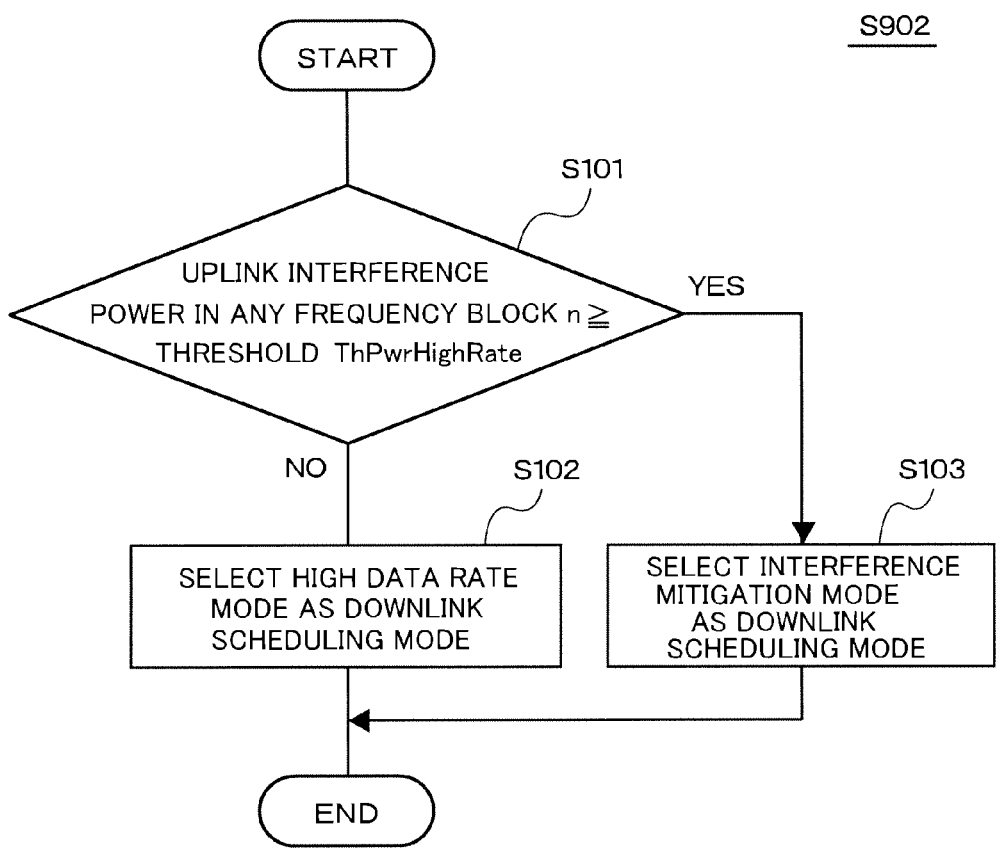
FIG. 10 is a flow chart of the process of selecting a downlink scheduling mode.

Referring to FIG. 10, there is shown the flow of the downlink scheduling mode determination step 902 that is performed by the downlink scheduling mode switching block 222 of the femto-cell BS 200, based on the uplink interference power level from the macro-cell MT 400. In FIG. 10, if there is no frequency block with uplink interference power level exceeding a predetermined threshold ThPwrHighRate (NO in S101), the downlink scheduling mode switching block 222 determines that the femto-cell MT 300 and the femto-cell BS 200 are located close to the cell center as shown in FIG. 4. The downlink scheduling mode switching block 222 of the femto-cell BS 200 selects the high data rate mode as the downlink scheduling mode (S102).

On the other hand, if M/N is less than the threshold ThPwrHighRate (YES in S101), the downlink scheduling mode switching block 222 of the femto-cell BS 200 determines that the femto-cell MT 300 and the femto-cell BS 200 are located close to the cell edge as shown in FIG. 5. The downlink scheduling mode switching block 222 of the femto-cell BS 200 selects the interference mitigation mode as the downlink scheduling mode (S103).

The determination of the downlink scheduling mode described in FIGS. 6 to 10 may be performed at the time when the femto-cell BS 200 is installed, or may be performed periodically.

In the downlink scheduling mode determination, even if the interference mitigation mode is selected as the downlink scheduling mode, the interference to the macro-cell MT 400 from the femto-cell BS 200 is not a problem, when the macro-cell MT 400 is not present in the vicinity of the femto-cell BS 200, or when the macro-cell 400 that was in the vicinity of the femto-cell BS 200 is moved far away. In such a case, the high data rate mode may be selected (redetermined) according to FIG. 11.

Figure 11:
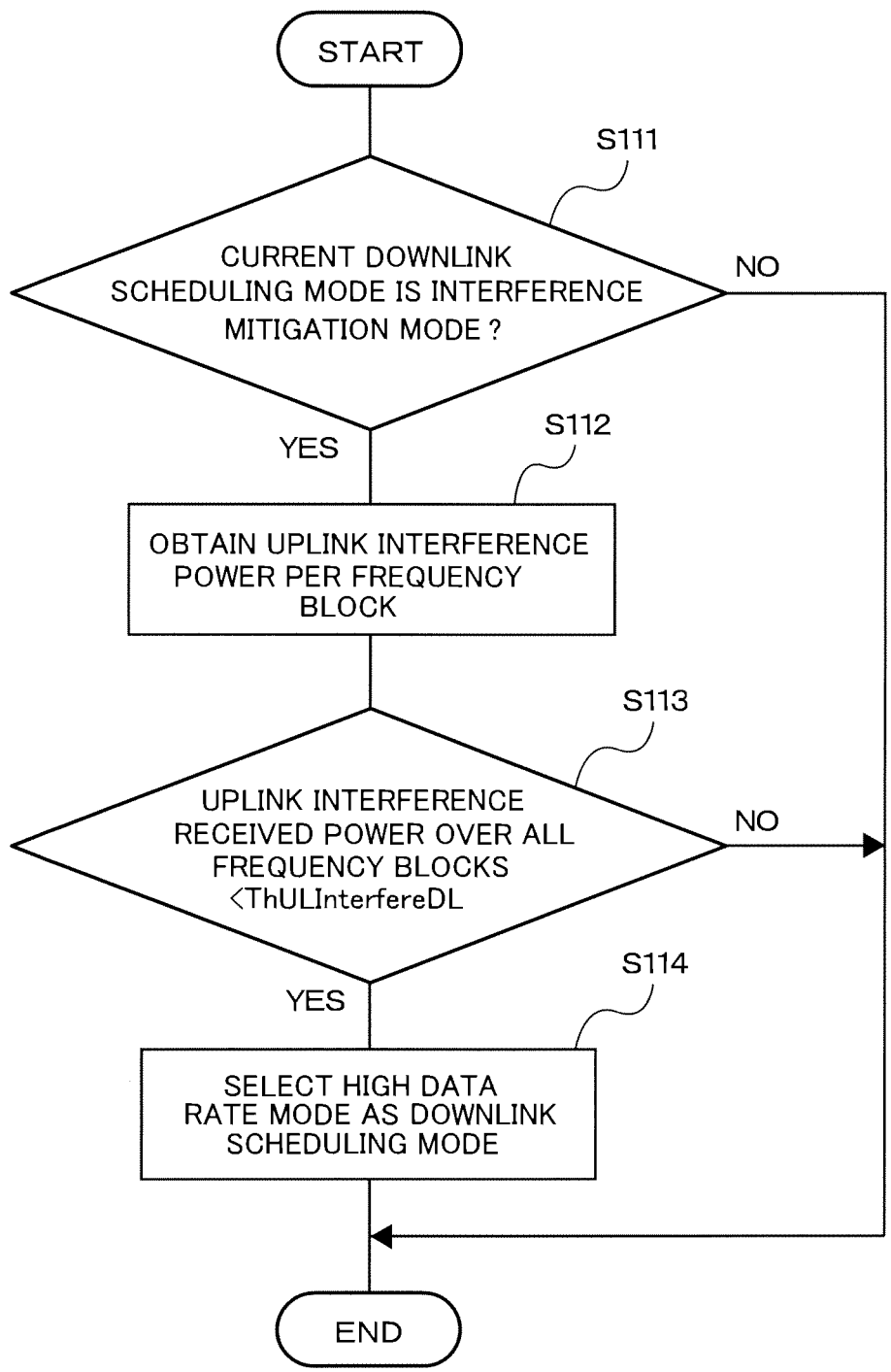
FIG. 11 is a flow chart of the process of re-determining a downlink scheduling mode.

Referring to FIG. 11, there is shown the flow of the downlink scheduling mode redetermination process that is performed by the downlink scheduling mode switching block 222 of the femto-cell BS 200, based on the uplink interference power level from the macro-cell MT 400. In FIG. 11, when the interference mitigation mode is selected as the downlink scheduling mode (YES in S111), the downlink scheduling mode switching block 222 of the femto-cell BS 200 obtains the uplink interference power level for each frequency block from the interference measurement block 221 (S112). Then, if the uplink interference level is less than a predetermined threshold ThULInterfereDL in all the frequency blocks (YES in S113), the downlink scheduling mode switching block 222 of the femto-cell BS 200 determines that the macro-cell MT 400 is not present in the vicinity of the femto-cell BS 200. The downlink scheduling mode switching block 222 of the femto-cell BS 200 selects the high data rate mode as the downlink scheduling mode (S114), and ends the redetermination process. If NO in step 111 or in step 113, the downlink scheduling mode switching block 222 of the femto-cell BS 200 ends the redetermination process, and continues the interference mitigation mode.

The downlink scheduling mode redetermination process shown in FIG. 11 may be performed after the downlink scheduling mode determination process shown in FIGS. 7, 8, and 10, or may be performed periodically.

The downlink scheduling mode will be described in detail with reference to FIGS. 12 to 20.

First Embodiment

A first embodiment that uses the downlink scheduling mode properly will be described with reference to FIGS. 12 to 15B. According to the first embodiment, in the high data rate mode, it is intended to increase the rate due to the frequency selectivity gain, by assigning frequency resources that are continuous in the frequency domain as downlink communication resources. Further, in the interference mitigation mode, it is intended to distribute the influence of interference to the macro-cell MT 400 from the femto-cell BS 200, by assigning frequency resources distributed in the frequency domain as downlink communication resources. The assignment of the frequency resources used for the downlink data transmission to the femto-cell MT 300 is performed by the downlink scheduler 223 of the femto-cell BS 200 according to the downlink scheduling mode determined by the downlink scheduling mode switching block 222.

The following description will focus on the frequency resource assignment method in the high data rate mode and in the interference mitigation mode, respectively, using a resource allocation (RA) type defined in E-UTRA. In sequence 605 of FIG. 6 and in sequence 904 of FIG. 9, the femto-cell BS 200 notifies the femto-cell MT 300 of the RA type and assigned frequency resources. In sequence 606 of FIG. 6 and in sequence 905 of FIG. 9, the downlink data transmission is performed according to the downlink scheduling information notified to the femto-cell MT 300.

Figure 12:
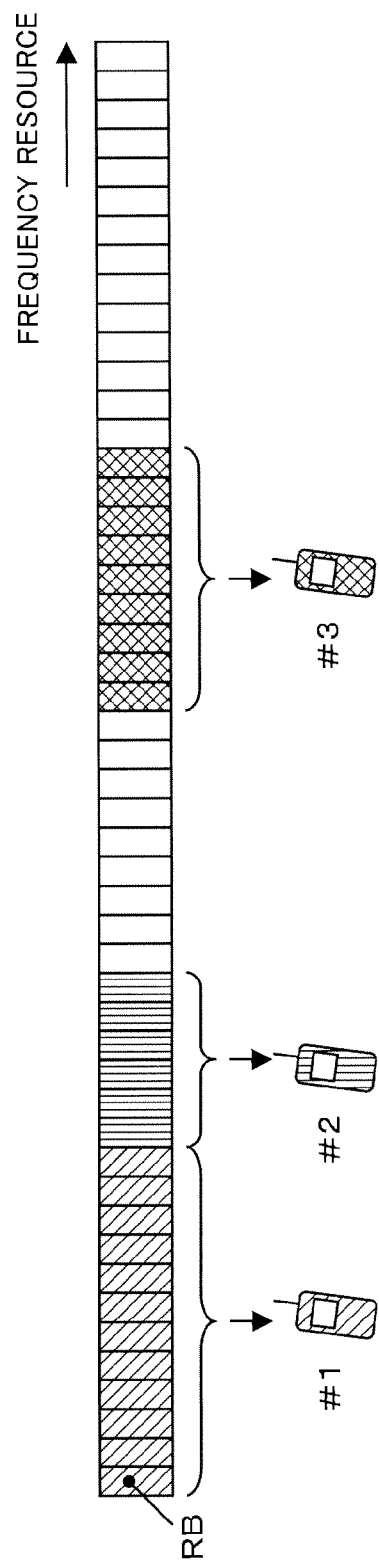
FIG. 12 is a diagram showing frequency resource assignment in high data rate mode.

The frequency resource assignment using RA Type 2-Localized, which is used in the high data rate mode, will be described with reference to FIG. 12. In FIG. 12, the horizontal axis represents the frequency, in which the full width is the bandwidth of the system. In E-UTRA, as shown in FIG. 12, the bandwidth of the system is divided into the smallest unit of frequency resources, which is called RB. In RA Type 2-Localized, a single RB or continuous RBs are assigned to a mobile terminal. Here, 12 RBs are assigned to a terminal #1, 6 RBs are assigned to a terminal #2, and 9 RBs are assigned to a terminal #3. The frequency selectivity gain can be obtained by centrally assigning RBs in a subband with a good radio channel quality by using RA Type 2-Localized. As a result, the communication quality can be improved.

Figure 13:
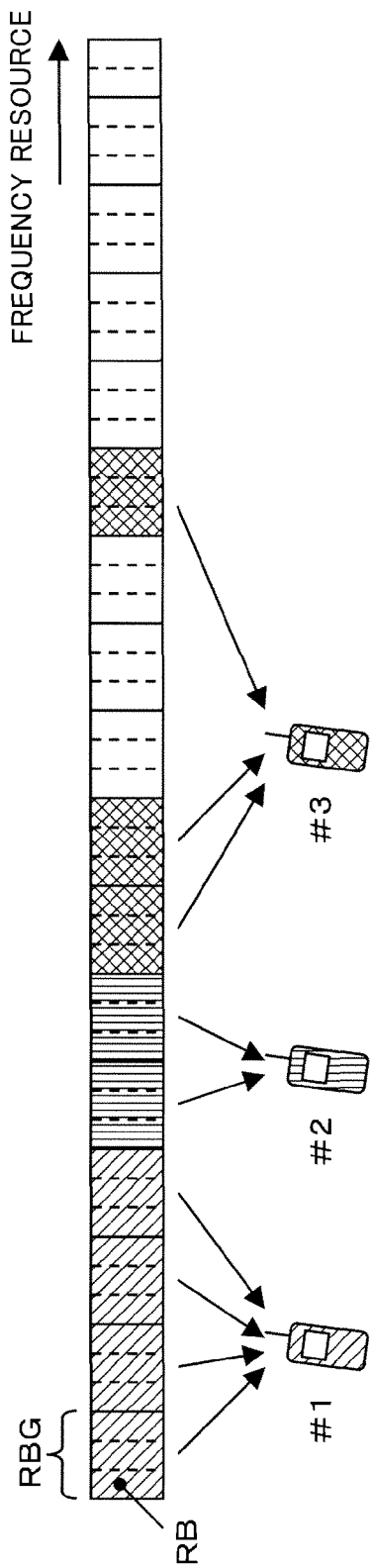
FIG. 13 is a diagram showing frequency resource assignment in high data rate mode.

The frequency resource assignment using RA Type 0, which is used in the high data rate mode, will be described with reference to FIG. 13. In E-UTRA, as shown in FIG. 13, a plurality of continuous RBs constitutes a resource block group (RBG). In RA Type 0, frequency resources are assigned to a mobile terminal in the unit of RBG. In RA Type 0, continuous RBGs may be assigned as the case of the terminals #1 and #2 shown in FIG. 13, or separate RBGs may be assigned as the case of the terminal #3 shown in FIG. 13. The frequency selectivity gain can be obtained by centrally assigning RBs in a subband with a good radio channel quality by using RA Type 0. As a result, the communication quality can be improved.

Figure 14:
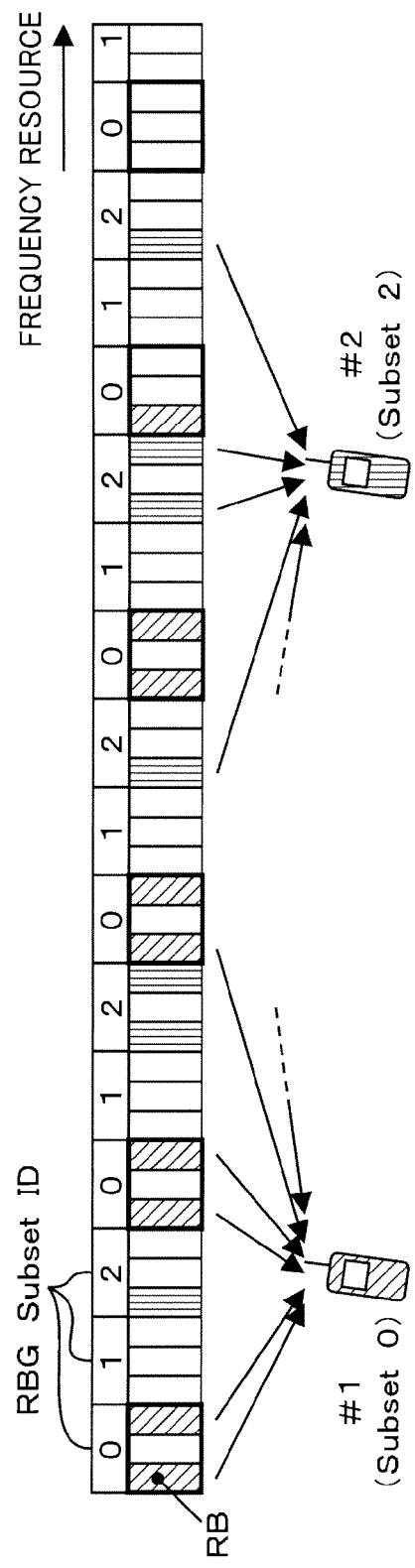
FIG. 14 is a diagram showing frequency resource assignment in interference mitigation mode.

The frequency resource assignment using RA Type 1, which is used in the interference mitigation mode, will be described with reference to FIG. 14. In E-UTRA, as shown in FIG. 14, a plurality of separate RBGs constitutes an RBG subset. In FIG. 14, three RBG subsets are present. In RA Type 1, frequency resources in one of the RBG subsets are assigned to a mobile terminal in the RB unit. Here, a subset 0 is assigned to the terminal #1, and a subset 2 is assigned to the terminal #2. In FIG. 14, up to three RBs can be assigned by selecting RBs from the same RBG. However, in order to distribute the influence of the active interference, it is desirable to select RBs from different RBGs as much as possible to assign distributed RBs. In this way, the macro-cell MT 400 receiving the influence of interference is expected to be different for each RB by assigning distributed RBs by using RA Type 1. At this time, the influence of interference given by the femto-cell BS 200 is distributed. As a result, the degradation of communication quality due to the interference can be suppressed in the macro-cell MT 400.

The frequency resource assignment using RA Type 2-Distributed, which is used in the interference mitigation mode, will be described with reference to FIGS. 15A and 15E. FIG. 15A shows the frequency resource in the logical domain and FIG. 15B shows the frequency resource in the physical domain, in which the horizontal axis is the frequency. In RA Type 2-Distributed, the specification of frequency resources is made in the logical domain. The resource assignment in the logical domain is performed as shown in FIG. 15A, which is the same as the resource assignment in RA Type 2-Localized. Virtual RB is mapped to physical RB that is used for data transmission, by using a predetermined permutation pattern. In the mapping from virtual RB to physical RB, as shown in FIGS. 15A and 15B, continuous virtual RBs are mapped to separate physical RBs. In RA Type 2-Distributed, separate physical RBs can be assigned in the frequency domain by assigning continuous virtual RBs. Thus, the macro-cell MT 400 receiving the influence of interference is expected to be different for each RB. At this time, the influence of interference given by the femto-cell BS 200 is distributed. As a result, the degradation of communication quality due to the interference can be suppressed in the macro-cell MT 400.

Second Embodiment

Figure 16:
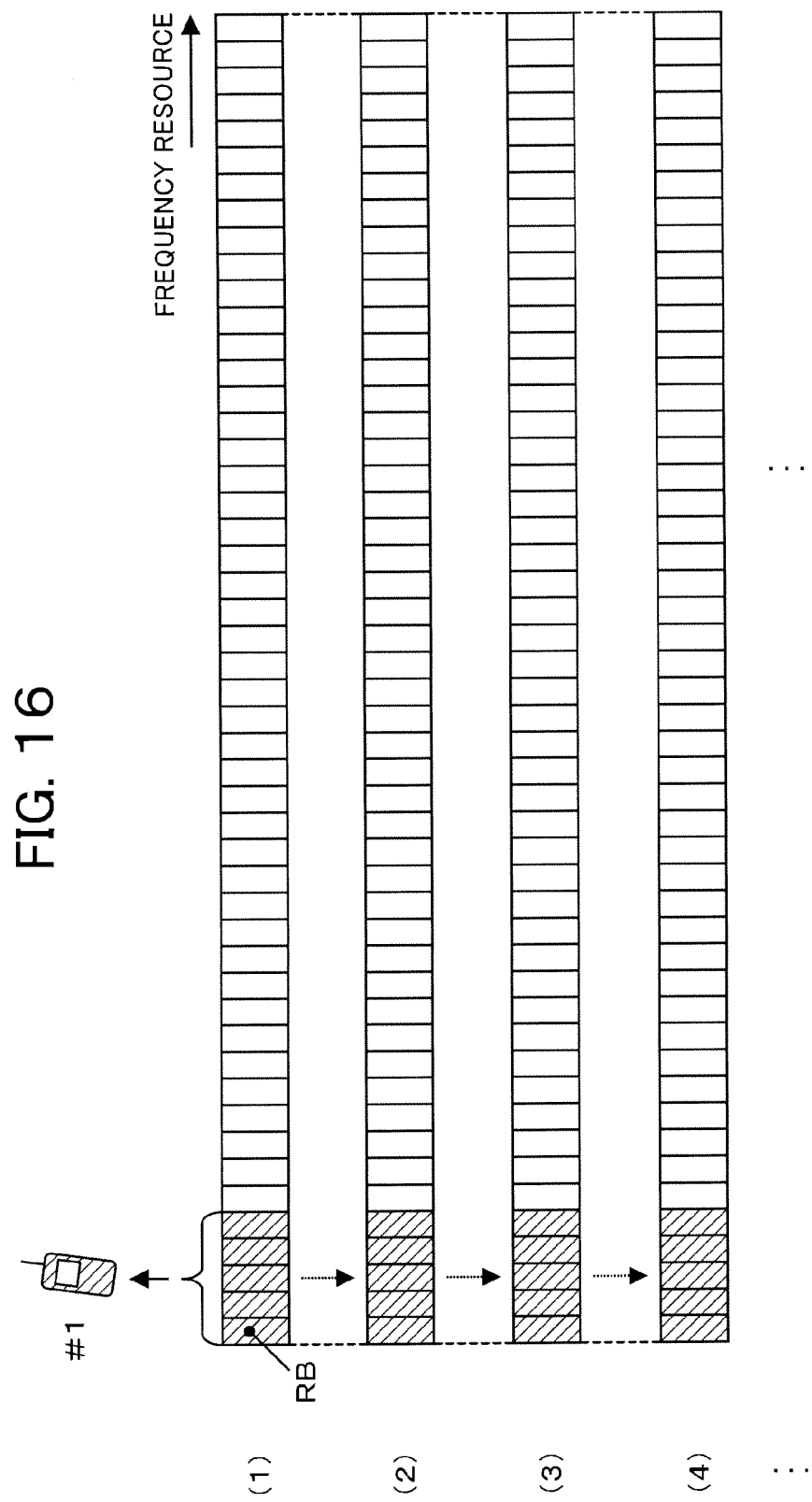
FIG. 16 is a diagram showing frequency resource assignment in high data rate mode.
Figure 17:
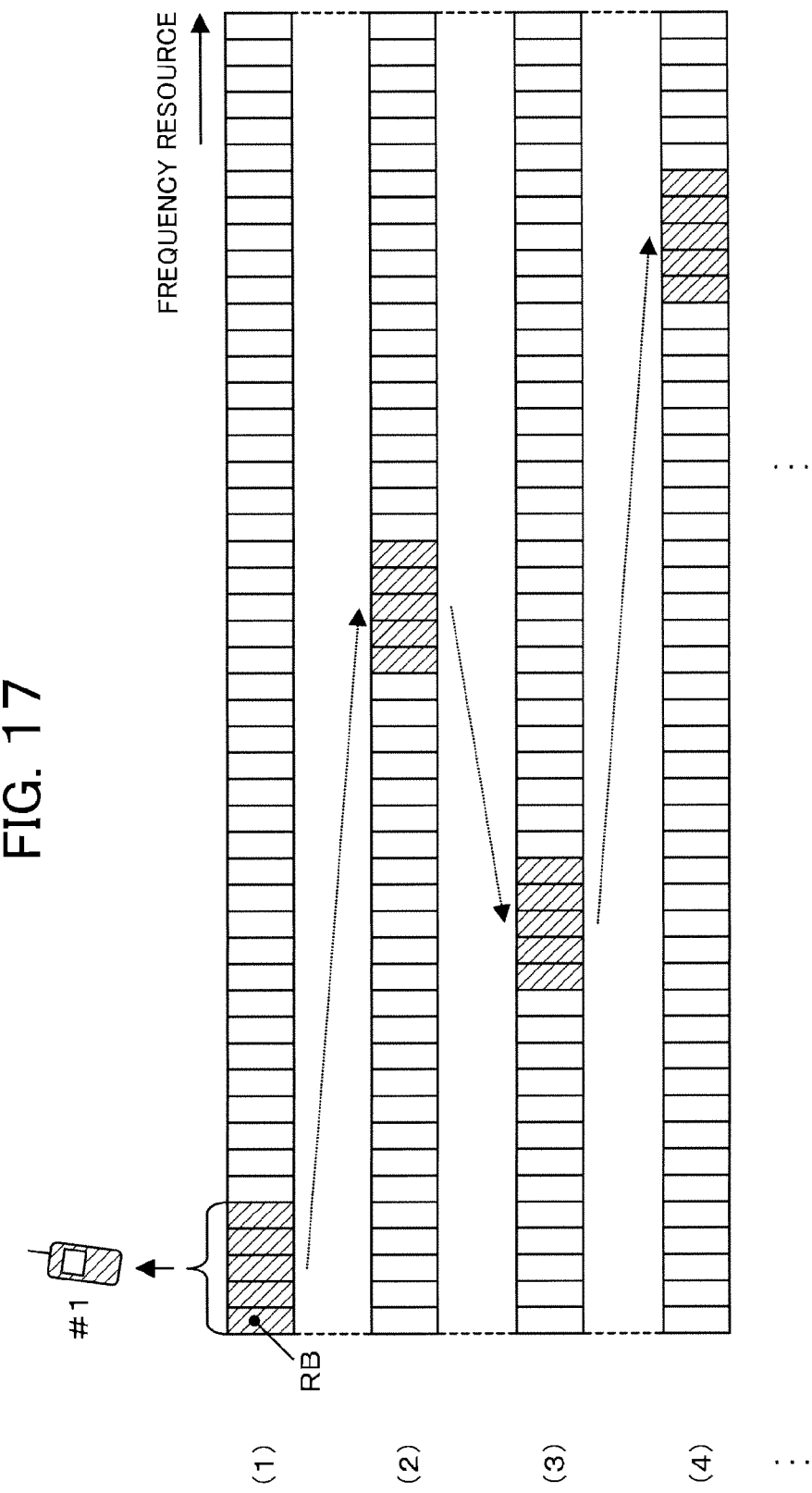
FIG. 17 is a diagram showing frequency resource assignment in interference mitigation mode.

A second embodiment that uses the downlink scheduling mode properly will be described with reference to FIGS. 16 and 17. According to the second embodiment, in the high data rate mode, it is intended to increase the rate due to the frequency sensitivity gain, by not applying frequency hopping to the frequency resources assigned as the downlink communication resources. Further, in the interference mitigation mode, it is intended to distribute the influence of interference to the macro-cell MT 400 from the femto-cell BS 200, by applying frequency hopping to the frequency resources assigned as the downlink communication resources.

In the following description, it is assumed that the frequency hopping is performed for each Hybrid Automatic Repeat Request (HARQ) transmission. The frequency resource assignment for HARQ transmission, which is used for the downlink data transmission to the femto-cell MT 300, is performed by the downlink scheduler 223 of the femto-cell BS 200 according to the downlink scheduling mode determined by the downlink scheduling mode switching block 222. The assigned frequency resources are notified, as the downlink scheduling information, by the femto-cell BS 200 to the femto-cell MT 300 in sequence 605 of FIG. 6 and in sequence 904 of FIG. 9. In sequence 606 of FIG. 6 and in sequence 905 of FIG. 9, the downlink data transmission is performed according to the downlink scheduling information notified to the femto-cell MT 300.

The frequency resource assignment without applying frequency hopping, which is used in the high data rate mode, will be described with reference to FIG. 16. In FIG. 16, the number n on the left side represents the number of times HARQ transmitted, and the horizontal axis represents the frequency. In FIG. 16, RBs assigned to the terminal #1 in the first HARQ transmission are the same as those in the subsequent transmissions. As described above, when the frequency hopping is not performed, the frequency sensitivity gain can be obtained by assigning RBs in a subband with a good channel radio channel quality for each HARQ retransmission. As a result, the communication quality can be improved. Note that in FIG. 16, the same RBs are assigned for each HARQ transmission. However, the assigned RBs are not necessarily exactly the same and it is enough to assign RBs in the same subband.

The frequency resource assignment to which frequency hopping is applied, which is used in the interference mitigation mode, will be described with reference to FIG. 17. In FIG. 17, the number n on the left side represents the number of times HARQ is transmitted, and the horizontal axis represents the frequency. In FIG. 17, RBs assigned to the terminal #1 are different for each of the HARQ transmissions (1, 2, 3, and 4). When frequency hopping is performed as described above, the macro-cell MT 400 receiving the influence of interference is expected to be different in each HARQ retransmission. At this time, the influence of interference given by the femto-cell BS 200 is distributed. As a result, the degradation of communication quality due to the interference can be suppressed in the macro-cell MT 400.

Third Embodiment

A third embodiment that uses the downlink scheduling mode properly will be described with reference to FIGS. 18 to 20. According to the third embodiment, in the high data rate mode, it is intended to increase the rate by improving the received SINR in the femto-cell MT 300 by using a high power spectrum density for the downlink data transmission. Further, in the interference mitigation mode, it is intended to reduce the received interference power spectrum density given by the femto-cell BS 200 to the macro-cell MT 400, by using a low power spectrum density for the downlink data transmission. Setting of the power spectrum density used for the downlink transmission to the femto-cell MT 300, is performed by the control information transmission processing block 227 according to the downlink scheduling mode determined by the downlink scheduling mode switching block 222 of the femto-cell BS 200.

The power spectrum density information is notified, as the transmission mode configuration, by the femto-cell BS 200 to the femto-cell MT 300 in sequence 604 of FIG. 6 or in sequence 903 of FIG. 9. In sequence 606 of FIG. 6 or in sequence 905 of FIG. 9, the downlink data transmission is performed according to the power spectrum density that is notified by the femto-cell BS 200 to the femto-cell MT 300 as described above.

Figure 18:
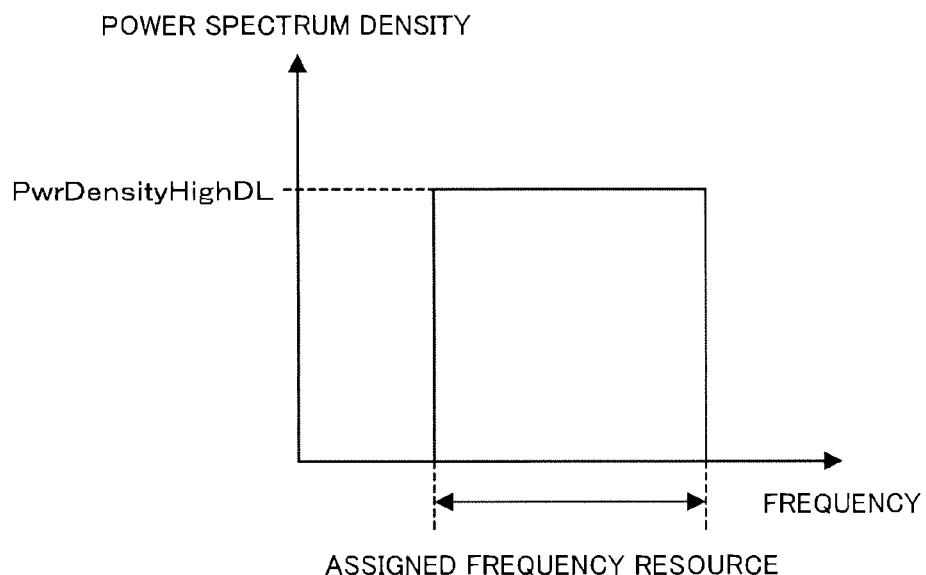
FIG. 18 is a diagram showing an example of the transmission power spectrum density in high data rate mode.

Referring to FIG. 18, there is shown the relationship in the high data rate mode between the transmission power spectrum density using a high power spectrum density PwrDensityHighDL, and the assigned frequency resource to a certain femto-cell MT 300. The femto-cell BS 200 performs the downlink data transmission by using the high transmission power spectrum density. Thus, the received SINR in the femto-cell MT 300 is improved. As a result, the communication quality can be improved.

Figure 19:
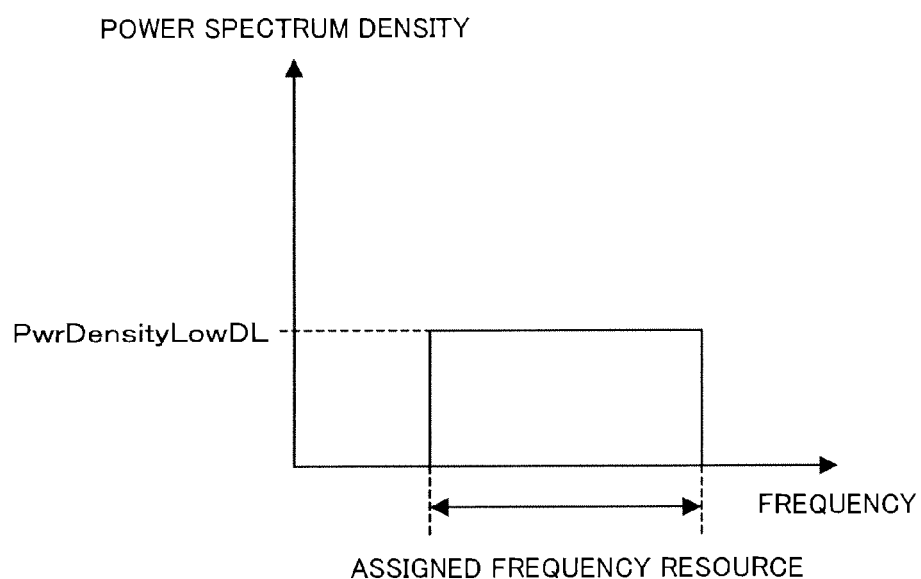
FIG. 19 is a diagram showing an example of the transmission power spectrum density in interference mitigation mode.

Referring to FIG. 19, there is shown the relationship in the interference mitigation mode between the transmission power spectrum density using a low power spectrum density PwrDensityLowDL, and the assigned frequency resource to a certain femto-cell MT 300. Here, it is assumed that PwrDensityLowDL is less than PwrDensityHighDL. The femto-cell BS 200 performs the downlink data transmission by using the low transmission power spectrum density. Thus, the received interference level in the macro-cell MT 400 from the femto-cell BS 200 is reduced. As a result, the degradation of communication quality due to the interference can be suppressed in the macro-cell MT 400.

A modulation and coding scheme (MCS) table will be described with reference to FIG. 20. In FIG. 20, a downlink MCS table 214/314 includes an MCS index 2141 and a sub-carrier modulation scheme 2142. Further, in E-UTRA, the PHY packet size is defined according to the MCS and the number of assigned RBs, based on which the coding rate of forward error correction (FEC) can be calculated. A coding rate 2143 in FIG. 20 represents the approximate value.

The downlink scheduler 223 of the femto-cell BS 200 selects an MCS from the downlink MCS table 214. The downlink scheduler 223 stores the MCS index of the selected MCS in the downlink scheduling information table 212. The femto-cell BS 200 transmits the downlink scheduling information to the femto-cell MT 300. The femto-cell MT 300 receives the data, by referring to the MCS index of the downlink scheduling information and to the downlink MCS table 314.

As described above, the received SINR in the femto-cell MT 300 is increased in the high data rate mode. Thus, the femto-cell BS 200 selects a high MCS for the downlink data transmission to the femto-cell MT 300.

On the other hand, in the interference mitigation mode, the femto-cell BS 200 performs the downlink data transmission by using a low transmission power spectrum density. Thus, the received SINR is reduced in the femto-cell MT 300. In the interference mitigation mode, the femto-cell BS 200 selects a low MCS in order to increase the probability of success of decoding.

The MCS used for the downlink data transmission is notified, as the downlink scheduling information, by the femto-cell BS 200 to the femto-cell MT 300 in sequence 605 of FIG. 6 or in sequence 904 of FIG. 9.

However, when a low MCS is selected, the PHY packet size is reduced and the data rate is reduced. The data rate can be maintained by increasing the number of RBs assigned to the femto-cell MT 300. By increasing the number of assigned RBs, it is possible to prevent the PHY packet size from being reduced, thereby preventing the data rate reduction, even when a low MCS is selected. At this time, the assigned frequency resource width (the number of RBs) shown in FIG. 19 is greater than the assigned frequency resource width (the number of RBs) shown in FIG. 18.

In the high data rate mode, the received SINR in the femto-cell MT 300 is increased. Thus, the data rate can be increased by performing spatial multiplexing (SM) with multiple-input multiple-output (MIMO) for the downlink data transmission from the femto-cell BS 200 to the femto-cell MT 300.

On the other hand, in the interference mitigation mode, the received SINR is degraded in the femto-cell MT 300. Thus, the communication quality can be improved by performing transmission diversity with space-time block code (STBC), and the like, for the downlink data transmission from the femto-cell BS 200 to the femto-cell MT 300.

Note that the first to third embodiments are not exclusive of each other, and a plurality of embodiments can be used in combination.

Next, the influence of interference in the uplink will be described using again FIGS. 4 and 5. The influence of the uplink interference received by the macro-cell BS 100 and by the femto-cell 200 will be described with reference to FIG. 4. In the following, it is assumed that, as the uplink transmission power control policy, the power spectrum density of the received signal in the macro-cell BS 100 from the macro-cell MT 400 is controlled to be constant between the macro-cell MTs 400. Also, in the femto-cell, the uplink transmission power setting is performed according to the power spectrum density of the received interference from the nearby macro-cell MTs 400. When the received power spectrum density of the interference given by the nearby macro-cell MTs 400 to the femto-cell BS 200 is large, the transmission power spectrum density of the femto-cell MT 300 is increased, in order to ensure stable communication quality (received SINR) in the femto-cell BS 200. On the other hand, when the received power spectrum density of the interference given by the nearby macro-cell MTs 400 to the femto-cell BS 200 is small, the transmission power spectrum density of the femto-cell MT 300 is reduced.

In FIG. 4, according to the uplink transmission power control policy, the power spectrum density of the received signal in the macro-cell BS 100 from the macro-cell MTs is constant, independent of the positions of the macro-cell MTs (400-1, 400-2). Further, because the femto-cell is located in the vicinity of the macro-cell BS 100, the transmission power spectrum density of the femto-cell MT 300 is relatively small. When the communication range in the femto-cell is sufficiently small, the transmission power spectrum density of the femto-cell MT 300 has a small variation in the used bandwidth of the system. For this reason, the variation of the received SINR in the macro-cell BS 100 can be considered to be small in the used bandwidth of the system.

In FIG. 4, the power spectrum density of the received signal in the femto-cell BS 200 from the femto-cell MT 300 has a small variation in the used bandwidth of the system. Further, because the femto-cell BS 200 is located in the vicinity of the macro-cell BS 100, the power spectrum density of the received interference from the macro-cell MTs is constant in the femto-cell BS 200, independent of the positions of the macro-cell MTs (400-1, 400-2). For this reason, the variation of the received SINR is considered to be small in the used bandwidth of the system.

The influence of the uplink interference received by the macro-cell BS 100 and by the femto-cell BS 200 will be described with reference to FIG. 5. In FIG. 5, according to the uplink transmission power control policy, the power spectrum density of the received signal in the macro-cell BS 100 from the macro-cell MTs is constant, independent of the positions of the macro-cell MTs (400-1, 400-2). This is similar to the case shown in FIG. 4. Further, the femto-cell is located far from the macro-cell BS 100 and in the vicinity of the macro-cell MT 400-2 in which the transmission power spectrum density is high. Thus, the transmission power spectrum density of the femto-cell MT 300 needs to be increased to a relatively large value. However, because the channel attenuation between the femto-cell MT 300 and the macro-cell BS 100 is large, the received interference in the macro-cell BS 100 is considered to be substantially unchanged from that in FIG. 4. Further, when the communication range in the femto-cell is sufficiently small, the transmission power spectrum density of the femto-cell MT 300 has a small variation in the used bandwidth of the system. For this reason, the variation of the received SINR in the macro-cell BS 100 is considered to be small in the used bandwidth of the system.

In FIG. 5, the variation of the power spectrum density of the received signal in the femto-cell BS 200 from the femto-cell MT 300 is small in the used bandwidth of the system. Further, in the femto-cell BS 200, the power spectrum density of the received interference from the macro-cell MT varies depending on the macro-cell MT which is the interference source. In the macro-cell MT 400-1 that is located close to the cell center, the transmission power spectrum density is small and the channel attenuation to the femto-cell BS 200 is large. Thus, the power spectrum density of the interference received by the femto-cell BS 200 is reduced. On the other hand, in the macro-cell MT 400-2 that is located close to the cell edge, the transmission power spectrum density is large and the channel attenuation to the femto-cell BS 200 is small. Thus, the power spectrum density of the interference received by the femto-cell BS 200 is increased. For this reason, in the femto-cell BS 200, the variation of the received SINR is considered to be large in the used bandwidth of the system. In particular, the influence of interference by the macro-cell MT 400-2 that is located close to the cell edge is considered to be large.

Due to the factors described above, the interference received by the femto-cell BS from the macro-cell MT has a great influence on the communication quality. Thus, in the following embodiments, the uplink scheduling mode is switched in the femto-cell BS to perform the uplink data transmission from the femto-cell MT, according to the interference given by the macro-cell MT. In other words, when the interference received by the femto-cell BS from the macro-cell MT is large, the femto-cell BS selects the frequency diversity mode as the uplink scheduling mode. On the other hand, when the interference received by the femto-cell BS from the macro-cell MT is small, the femto-cell BS selects the time diversity mode as the uplink scheduling mode. The scheduling mode will be described in detail below.

In the femto-cell BS, the uplink scheduling mode is determined by estimating the state of the interference from the macro-cell MT, which will be described with reference to FIGS. 21, 22, 23, 24, and 25.

Figure 21:
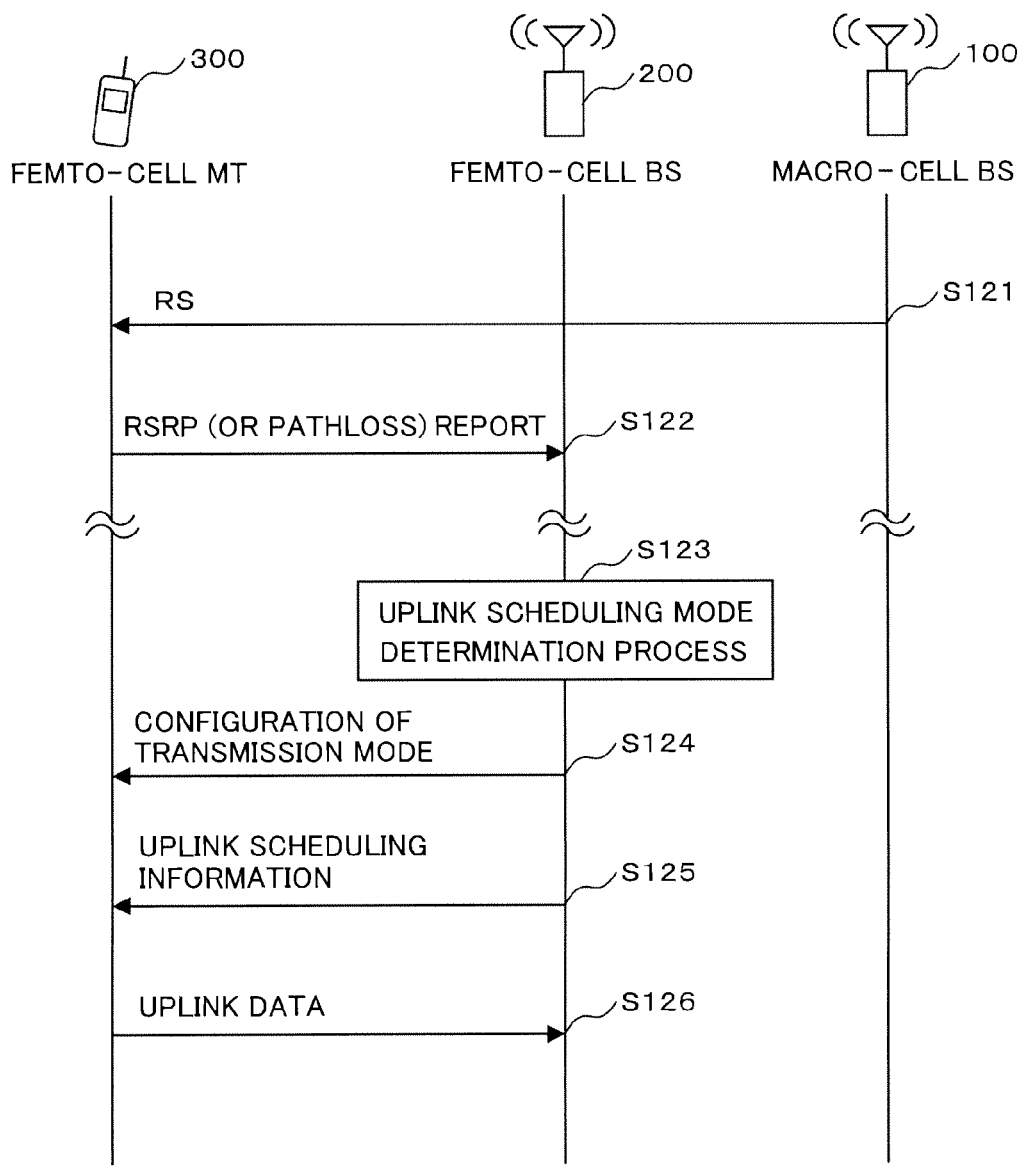
FIG. 21 is a sequence diagram of the procedure for determining the state of the interference given by the macro-cell MT.
Figure 22:
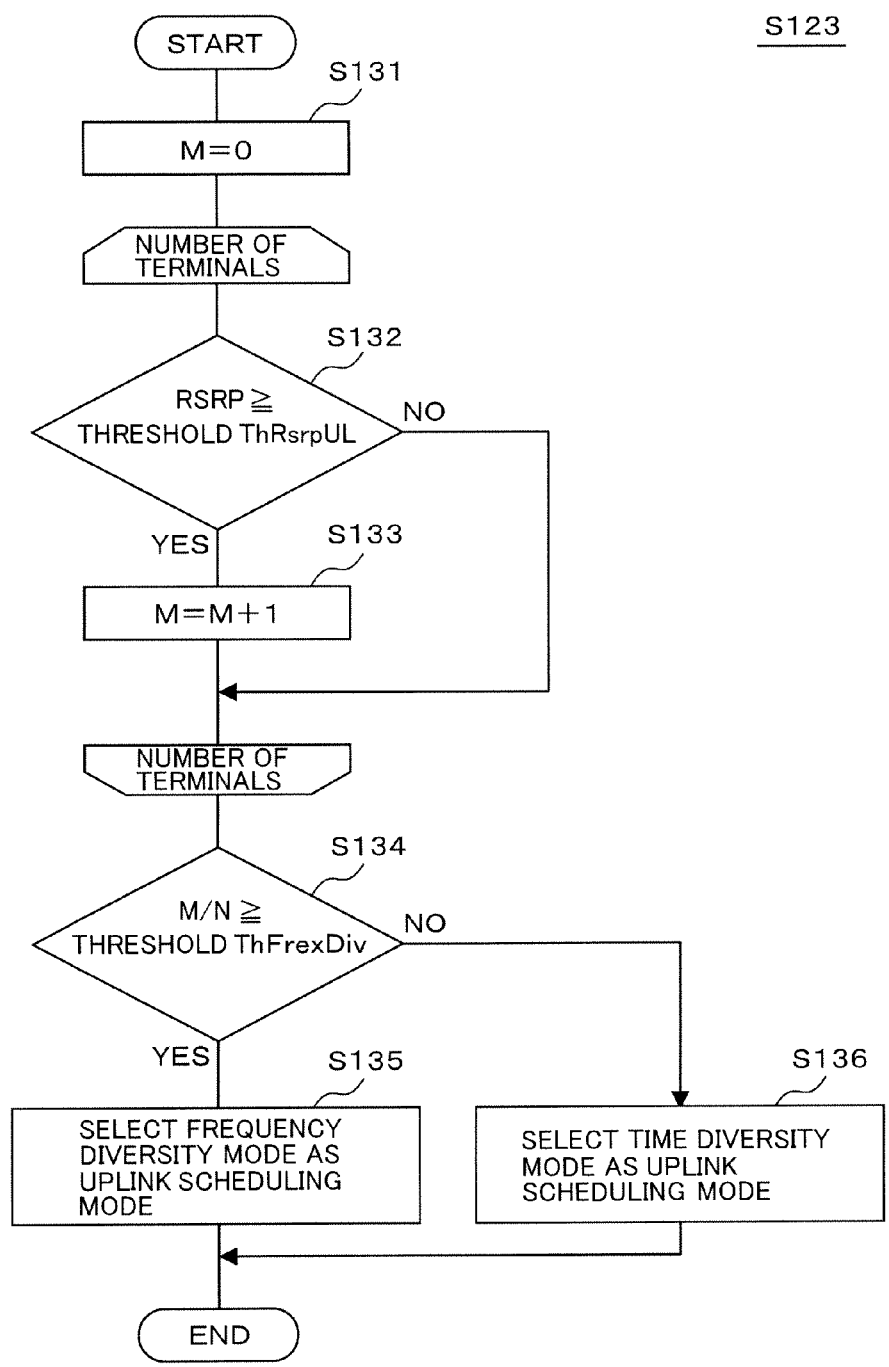
FIG. 22 is a flow chart of the process of selecting an uplink scheduling mode.
Figure 23:
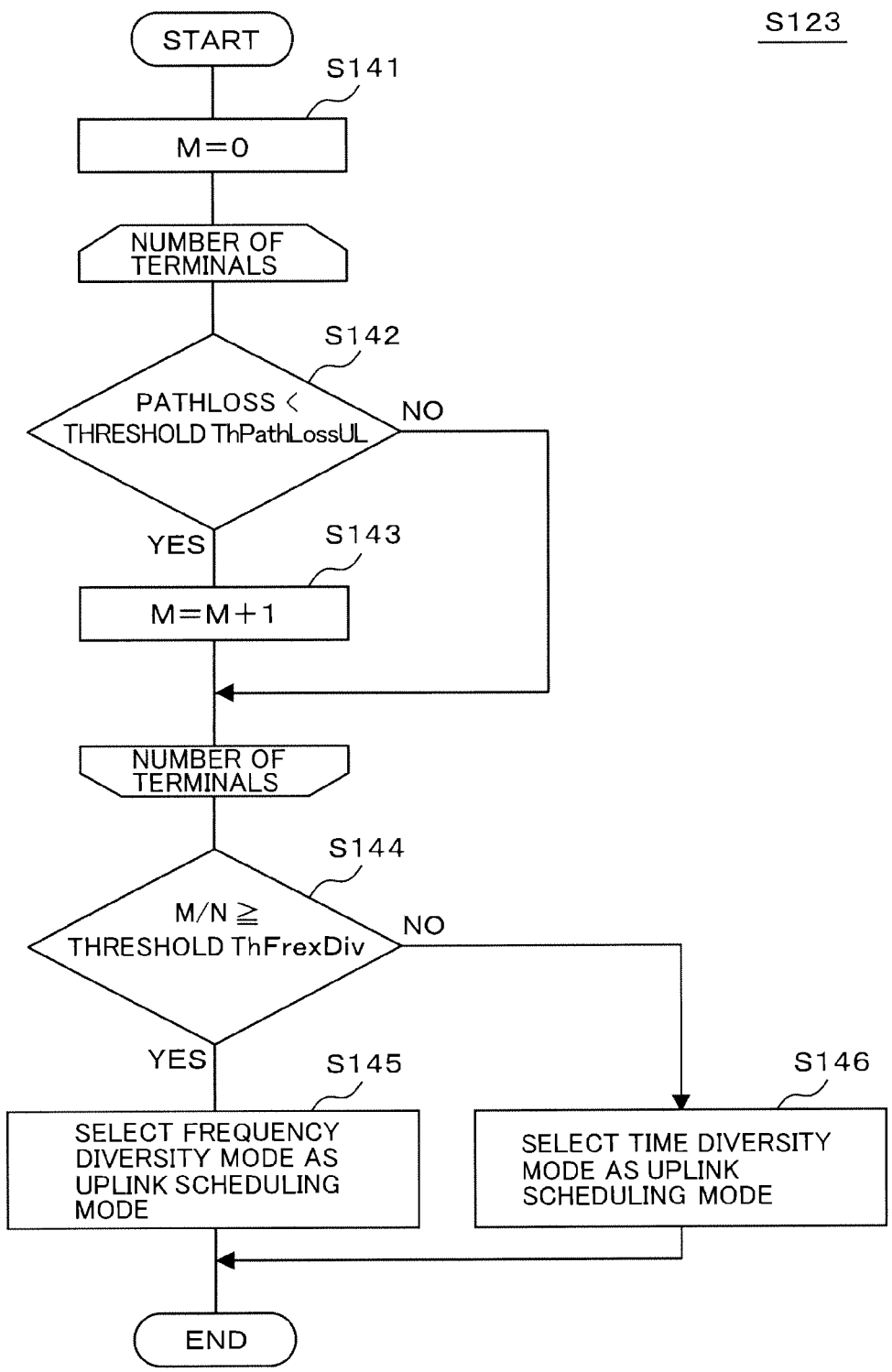
FIG. 23 is a flow chart of the process of selecting an uplink scheduling mode.
Figure 24:
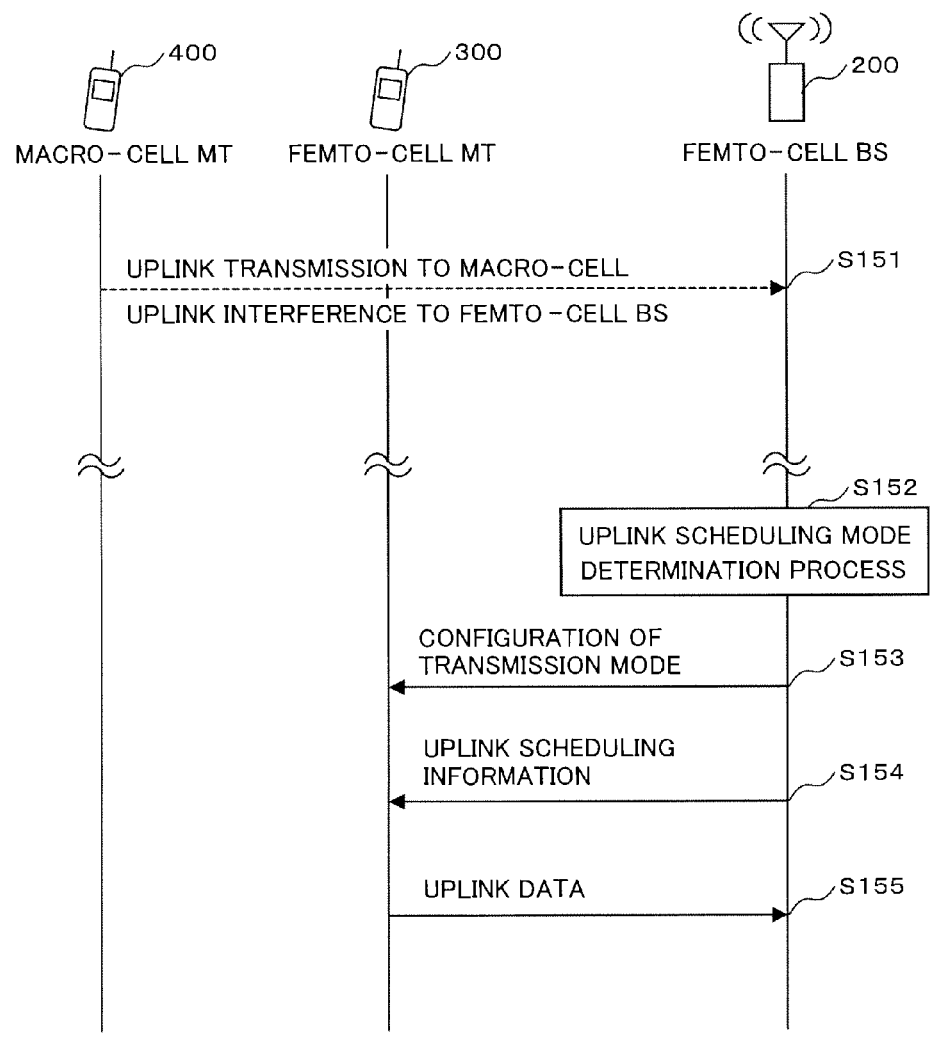
FIG. 24 is a sequence diagram of the procedure for determining the state of the interference given by the macro-cell MT.
Figure 25:
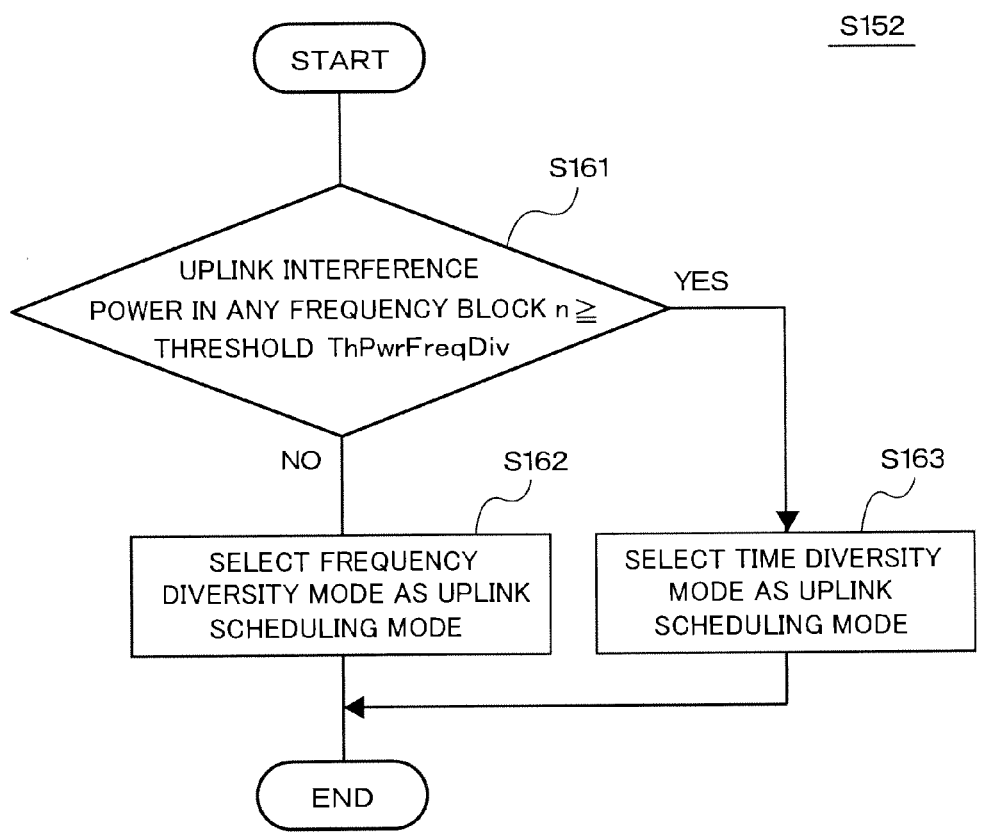
FIG. 25 is a flow chart of the process of selecting an uplink scheduling mode.

FIGS. 21 and 24 show the sequence for determining the uplink scheduling mode. FIGS. 22, 23, and 25 show the process for determining the uplink scheduling mode.

Referring to FIG. 21, there is shown the procedure for determining the state of the interference from the macro-cell MT to the femto-cell BS, according to the information that is notified by the femto-cell MT to the femto-cell BS. In FIG. 21, the macro-cell BS 100 transmits a reference signal (RS) (S121). The femto-cell MT 300 causes the reference signal power measurement block 321 to calculate the power level of the reference signal (RSRP) that is received through the radio I/F 303. Alternatively, the femto-cell MT 300 causes the pathloss calculation block 322 to calculate the pathloss between the macro-cell BS 100 and the femto-cell MT 300, by using the received power level of the reference signal and the transmission power of the reference signal in the macro-cell BS 100. Next, the femto-cell MT 300 notifies the femto-cell BS 200 of the calculated RSRP or pathloss (S122).

The femto-cell BS 200 stores the RSRP or pathloss information that is notified by one femto-cell MT 300 or a plurality of femto-cell MTs 300, into the interference information table 211. The femto-cell BS 200 causes the uplink scheduling mode switching block 224 to determine the uplink scheduling mode by using the RSRP or pathloss information (S123). Then, the femto-cell BS 200 sets the configuration for the uplink data transmission if necessary (S124). The femto-cell BS 200 transmits the resource assignment information for the uplink data transmission to the femto-cell MT 300 as the uplink scheduling information (S125). The femto-cell MT 300 transmits the uplink data to the femto-cell BS 200 (S126).

Referring to FIG. 22, there is shown the flow of the uplink scheduling mode determination process S123 that is performed by the uplink scheduling mode switching block 224 of the femto-cell BS 200 based on RSRP. In FIG. 22, first the femto-cell BS 200 initializes the number of mobile terminals M, in order to count the number of mobile terminals M with RSRP exceeding a predetermined threshold (S131). If there is a mobile terminal with RSRP exceeding a threshold ThRsrpUL (YES in S132), the femto-cell BS 200 adds 1 to the number of mobile terminals M (S133). The processes of step 132 and step 133 are performed with respect to N femto-cell MTs that have notified the femto-cell BS 200 of RSRP.

Then, if the ratio of the number of mobile terminals with RSRP exceeding the threshold ThRsrpUL to the number of femto-cell MTs that have notified the femto-cell BS 200 of RSRP, M/N, is equal to or greater than a predetermined threshold ThFreqDiv (YES in S134), the femto-cell BS 200 determines that the femto-cell MT 300 and the femto-cell BS 200 are located close to the cell center as shown in FIG. 4. The femto-cell BS 200 selects the frequency diversity mode as the uplink scheduling mode (S135). If M/N is less than the threshold ThFreqDiv (NO in S134), the femto-cell BS 200 determines that the femto-cell MT 300 and the femto-cell BS 200 are located close to the cell edge as shown in FIG. 5. The femto-cell BS 200 selects the time diversity mode as the uplink scheduling mode (S136).

Referring to FIG. 23, there is shown the flow of the uplink scheduling mode determination process S123 that is performed by the uplink scheduling mode switching block 224 of the femto-cell BS 200, based on the pathloss between the macro-cell BS 100 and femto-cell MT 300. In FIG. 23, first the femto-cell BS 200 initializes the number of mobile terminals M, in order to count the number of mobile terminals M with RSRP exceeding a predetermined threshold (S141). If there is a mobile terminal with pathloss less than a threshold ThPathLossUL (YES in S142), the femto-cell BS 200 adds 1 to the number of mobile terminals M (S143). The processes of step 142 and step 143 are performed with respect to N femto-cell MTs that have notified the femto-cell BS 200 of pathloss. Then, if the ratio of the number of mobile terminals with RSRP less than the threshold ThPathLossUL, to the number of femto-cell MTs that have notified the femto-cell BS 200 of pathloss, M/N, is equal to or greater than a predetermined threshold ThFreqDiv (YES in S144), the femto-cell BS 200 determines that the femto-cell MT 300 and the femto-cell BS 200 are located close to the cell center as shown in FIG. 4. The femto-cell BS 200 selects the frequency diversity mode as the uplink scheduling mode (S145). If M/N is less than the threshold ThFreqDiv (NO in S144), the femto-cell BS 200 determines that the femto-cell MT 300 and the femto-cell BS 200 are located close to the cell edge as shown in FIG. 5. The femto-cell BS 200 selects the time diversity mode as the uplink scheduling mode (S146).

In FIGS. 21, 22, and 23, the uplink scheduling mode is determined based on RSRP or pathloss with respect to a single macro-cell BS. However, it may also be based on RSRP or pathloss with respect to a plurality of macro-cell BSs.

In FIGS. 21, 22 and 23, the femto-cell MT 300 measures RSRP or pathloss. However, the femto-cell BS 200 may perform the downlink reception function and measurement of RSRP or pathloss.

In FIG. 22, the downlink scheduling mode is selected using RSRP with respect to the macro-cell. However, the relative value of RSRP with respect to the macro-cell, to RSRP with respect to the femto-cell may also be used as the selection criterion.

In FIG. 23, the uplink scheduling mode is determined based on the pathloss notified by the femto-cell MT 300 to the femto-cell BS 200. However, it is also possible to determine the uplink scheduling mode, by using the pathloss calculated by the femto-cell BS 200 using the RSRP notified by the femto-cell MT 300 to the femto-cell BS 200, and using the transmission power of the reference signal in the macro-cell BS 100.

Referring to FIG. 24, there is shown the procedure for determining the state of the interference from the macro-cell MT to the femto-cell BS, according to the uplink interference information that is measured by the femto-cell BS. In FIG. 24, the macro-cell MT 400 performs an uplink transmission to the macro-cell BS 100. The uplink transmission by the macro-cell MT 400 is received by the femto-cell BS 200 as interference (S151). The femto-cell BS 200 causes the interference measurement block 221 to calculate the interference power level from a plurality of macro-cell MTs 400, for each of the divided frequency blocks of the used frequency band. Here, it is desirable that the frequency block is a resource block (RE) which is the smallest unit of the frequency resource assignment in E-UTRA. The femto-cell BS 200 causes the uplink scheduling mode switching block 224 to determine the uplink scheduling mode by using the calculated interference power level from the macro-cell MT 400 (S152). Then, the femto-cell BS 200 sets the configuration for the uplink data transmission if necessary (S153). The femto-cell BS 200 transmits the resource assignment information for the uplink data transmission to the femto-cell MT 300 as the uplink scheduling information (S154). The femto-cell MT 300 transmits the uplink data to the femto-cell BS 200 (S155).

Referring to FIG. 25, there is shown the flow of the uplink scheduling mode determination process 5152 that is performed by the uplink scheduling mode switching block 224 of the femto-cell BS 200, based on the uplink interference power level from the macro-cell MT 400. In FIG. 25, if there is no frequency block with uplink interference power level exceeding a predetermined threshold ThPwrFreqDiv (NO in S161), the femto-cell BS 200 determines that the femto-cell MT 300 and the femto-cell BS 200 are located close to the cell center as shown in FIG. 4. The femto-cell BS 200 selects the frequency diversity mode as the uplink scheduling mode (S162).

If M/N is less than the threshold ThPwrFreqDiv (YES in S161), the femto-cell BS 200 determines that the femto-cell MT 300 and the femto-cell BS 200 are located close to the cell edge as shown in FIG. 5. The femto-cell BS 200 selects the time diversity mode as the uplink scheduling mode (S163).

In FIG. 25, the uplink scheduling mode is selected based on the uplink interference power for each frequency block. However, the difference of the uplink interference power between frequency blocks may also be used as the selection criterion. For example, if the uplink interference power difference between any frequency blocks is equal to or greater than a predetermined threshold, the time diversity mode is selected as the uplink scheduling mode, and otherwise the frequency diversity mode is selected.

The uplink scheduling mode determination described in FIGS. 21 to 25 may be performed at the time when the femto-cell BS 200 is installed or may be performed periodically.

In the determination of the uplink scheduling mode, even if the time diversity mode is selected as the uplink scheduling mode, the interference from the macro-cell MT 400 to the femto-cell BS 200 is not a problem when no macro-cell MT 400 is present in the vicinity of the femto-cell BS 200, or when the macro-cell MT 400 that was present in the vicinity of the femto-cell BS 200 is moved far away. In such a case, the frequency diversity mode may be selected (redetermined) according to FIG. 26.

Figure 26:
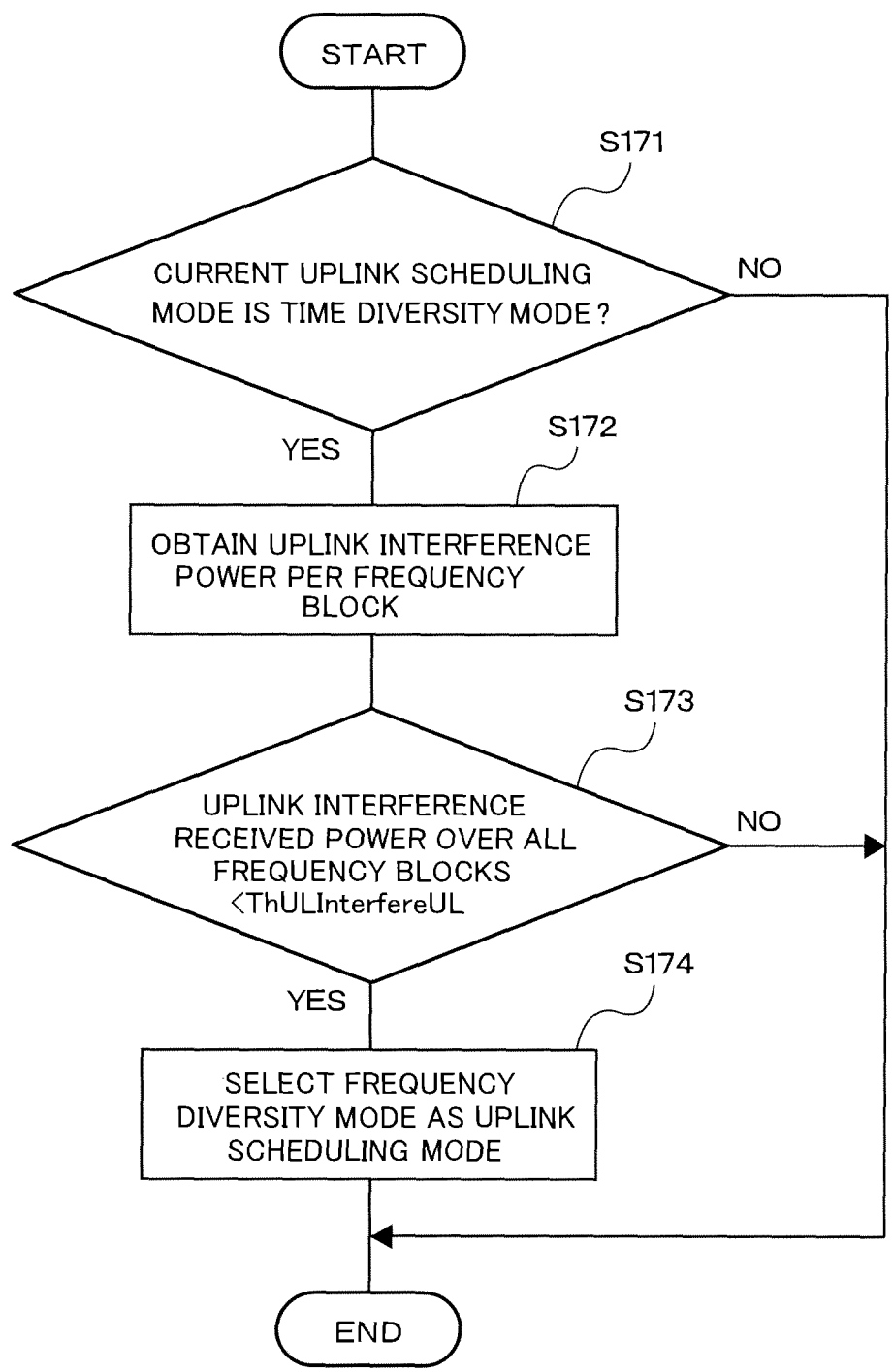
FIG. 26 is a flow chart of the process of re-determining an uplink scheduling mode.

Referring to FIG. 26, there is shown the flow of the uplink scheduling mode redetermination process that is performed by the uplink scheduling mode switching block 224 of the femto-cell BS 200, based on the uplink interference power level from the macro-cell MT 400. In FIG. 26, when the time diversity mode is selected as the uplink scheduling mode (YES in S171), the femto-cell BS 200 obtains the uplink interference power level for each frequency block, from the interference measurement block 221 (S172). Then, if the uplink interference power level is less than a predetermined threshold ThULInterfereUL in all the frequency blocks (YES in S173), the femto-cell BS 200 determines that the macro-cell MT 400 is not in the vicinity of the femto-cell BS 200. The femto-cell BS 200 selects the frequency diversity mode as the uplink scheduling mode (S174), and ends the redetermination process. If NO in step 171 or in step 173, the femto-cell BS 200 ends the redetermination process.

The uplink scheduling mode redetermination process shown in FIG. 26 may be performed after the uplink scheduling mode determination process shown in FIGS. 22, 23, and 25, or may be performed periodically.

The uplink scheduling mode will be described in detail with reference to FIGS. 27 to 30.

Fourth Embodiment

A fourth embodiment that uses the uplink scheduling mode properly will be described with reference to FIGS. 27 to 29. According to the fourth embodiment, in the frequency diversity mode, the uplink data transmission of the femto-cell MT 300 is performed by using a low power spectrum density, assuming that the macro-cell MT 400-1 having low power spectrum density is present in the vicinity of the femto-cell as shown in FIG. 4. Further, in the time diversity mode, the uplink data transmission of the femto-cell MT 300 is performed by using a high power spectrum density, assuming that the channel attenuation from the femto-cell to the macro-cell BS 100 is large as the case shown in FIG. 5. The power spectrum density used for the uplink data transmission of the femto-cell MT 300 is determined by the uplink transmission power control block 230, according to the uplink scheduling mode determined by the uplink scheduling mode switching block 224 of the femto-cell BS 200. Then, the determined uplink power spectrum density is forwarded to the control information processing block 227.

The power spectrum density information is notified, as the configuration of the transmission mode, by the femto-cell BS 200 to the femto-cell MT 300 in step 124 of FIG. 21 or in step 153 of FIG. 24. Alternatively, the power spectrum density information is notified, as the scheduling information such as the transmission power command, by the femto-cell BS 200 to the femto-cell MT 300 in step 125 of FIG. 21 or in step 154 of FIG. 24. The uplink data transmission in step 126 of FIG. 21 or in step 155 of FIG. 24 is performed, by using the transmission power determined by the transmission power control block 323 according to the power spectrum density information that is notified to the femto-cell MT 300 as described above.

Figure 27:
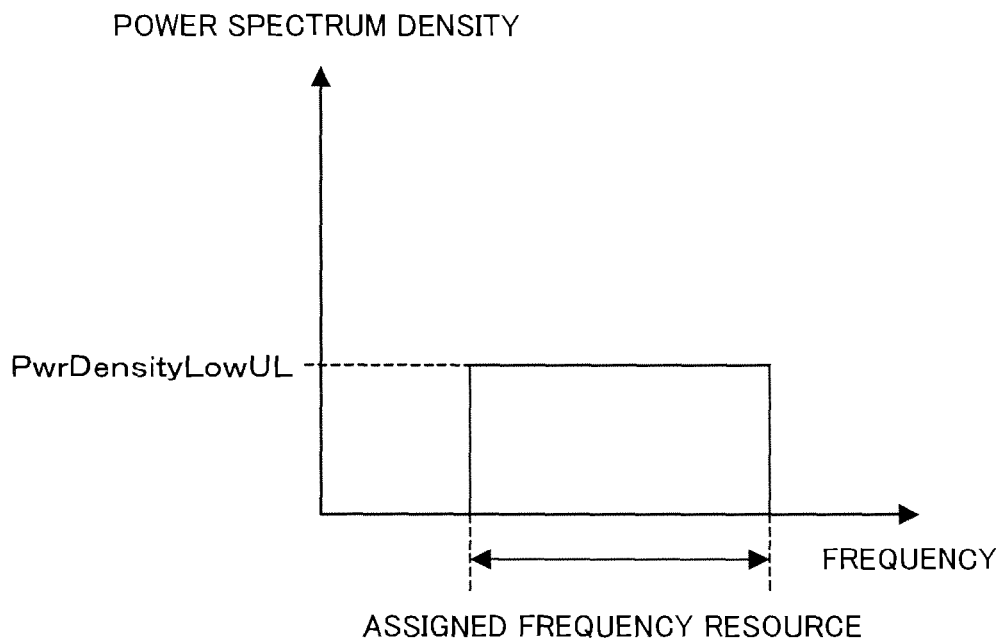
FIG. 27 is a diagram showing an example of the transmission power spectrum density in frequency diversity mode.

Referring to FIG. 27, there is shown the relationship in the frequency diversity mode between the target received power spectrum density using a low power spectrum density PwrDensityLowUL and the assigned frequency resource to a certain femto-cell MT 300. In FIG. 27, the frequency diversity mode reduces the power spectrum density, increases the frequency resource width (the number of assigned RBs), and reduces the MCS (in the direction from 64QAM to QPSK).

Figure 28:
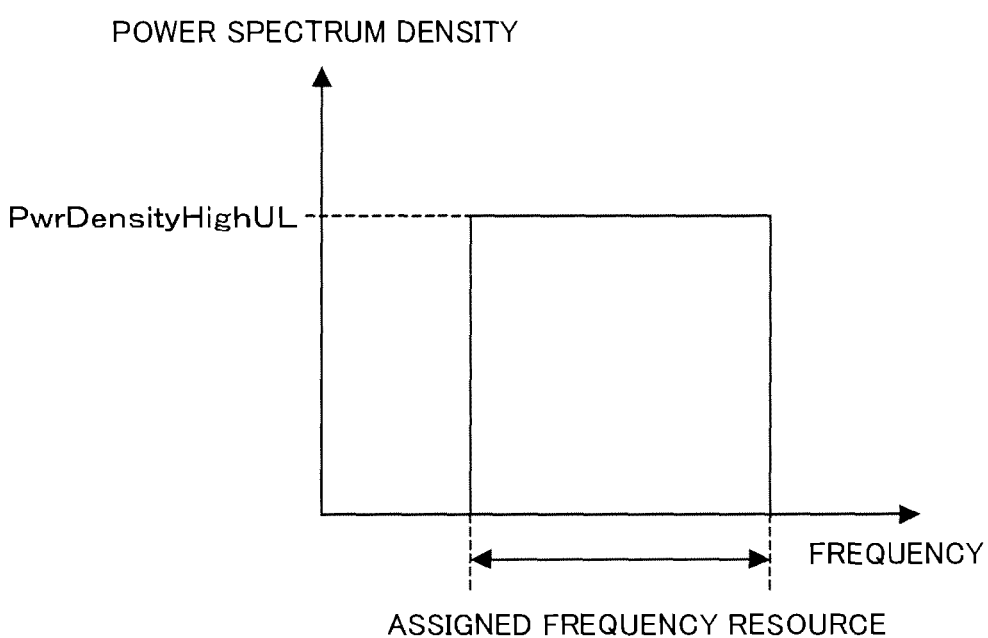
FIG. 28 is a diagram showing an example of the transmission power spectrum density in time diversity mode.

Referring to FIG. 28, there is shown the relationship in the time diversity mode between the target received power spectrum density using a high power spectrum density PwrDensityHighUL, and the assigned frequency resource to a certain femto-cell MT 300. Note that PwrDensityHighUL is greater than PwrDensityLowUL. In FIG. 28, the time diversity mode increases the power spectrum density, reduces the frequency resource width (the number of assigned RBs), and increases the MCS.

The MCS that can be used for data transmission of E-UTRA will be described with reference to FIG. 29. In FIG. 29, the uplink MCS table 215/315 includes an MCS index 2151 and a subcarrier modulation scheme 2152. Further, in E-UTRA, the PHY packet size is defined according to the MCS and the number of assigned RBs, based on which the coding rate of forward error correction (FEC) can be calculated. A coding rate 2153 shown in FIG. 29 represents the approximate value.

The uplink scheduler 225 of the femto-cell BS 200 selects an MCS from the uplink MCS table 215. The uplink scheduler 225 stores the MCS index of the selected MCS in the uplink scheduling information table 213. The femto-cell BS 200 transmits the uplink scheduling information to the femto-cell MT 300. The femto-cell MT 300 transmits the uplink data by referring to the MCS index of the uplink scheduling information and to the uplink MCS table 315.

The MCS used for the uplink data transmission is notified, as the uplink scheduling information, by the femto-cell BS 200 to the femto-cell MT 300 in step 125 of FIG. 21 or in step 154 of FIG. 24.

As described with reference FIG. 27, the target received power spectrum density is low in the frequency diversity mode. Thus, in order to increase the probability of success of uplink data decoding, a low MCS can be selected. However, when a low MCS is selected, the PHY packet size is reduced and the data rate is reduced. The data rate can be maintained by increasing the number of RBs assigned to the femto-cell MT 300. Even if a low MCS is selected, the PHY packet size is not reduced by increasing the number of assigned RBs, thereby preventing the reduction in the data rate.

On the other hand, as described with reference to FIG. 28, the target received power spectrum density is high in the time diversity mode. In this case, unlike the frequency diversity mode, a high MCS can be selected. When a high MCS is selected, the transmission data size per RB is larger than when a low MCS is selected. Thus, the number of assigned RBs can be reduced. At this time, the assigned frequency resource width (the number of RBs) shown in FIG. 28 is greater than the assigned frequency resource width (the number of RBs) shown in FIG. 27. As has been described above, the femto-cell arrangement shown in FIG. 5 is assumed in the selection of the time diversity mode. In this case, the received SINR in the femto-cell BS 200 varies in the frequency domain. Thus, in the time diversity mode, RBs are centrally assigned in a subband with a good channel state, in order to obtain the frequency selectivity gain, while avoiding the interference from the macro-cell MT 400-2 that is located in the vicinity of the femto-cell.

The MCS used for the uplink data transmission to the femto-cell MT 300 is determined by the uplink scheduler 225 of the femto-cell BS 200, according to the uplink scheduling mode determined by the uplink scheduling mode switching block 224. The determined MCS is notified, as the uplink scheduling information, by the femto-cell BS 200 to the femto-cell MT 300 in step 125 of FIG. 21 or in step 154 of FIG. 24. The uplink data transmission in step 126 of FIG. 21 and in step 155 of FIG. 25 is performed according to the uplink scheduling information that is notified by the femto-cell BS 200 to the femto-cell MT 300 as described above.

Fifth Embodiment

A fifth embodiment that uses the uplink scheduling mode properly will be described with reference to FIG. 30. According to the fifth embodiment, the number of HARQ transmissions is reduced in the frequency diversity mode, and the number of HARQ transmissions is increased in the time diversity mode.

The HARQ transmission in the E-UTRA uplink data transmission will be described with reference to FIG. 30. In FIG. 30, the femto-cell MT 300 performs the first HARQ transmission in a subframe 2, the second HARQ transmission in a subframe 10, the third HARQ transmission in a subframe 18, and the fourth HARQ transmission in a subframe 26. In other words, in FIG. 30, the femto-cell MT 300 performs the HARQ transmission every eight subframes. However, when receiving an ACK response from the femto-cell BS 200, the femto-cell MT 300 stops the subsequent HARQ transmissions.

The femto-cell arrangement shown in FIG. 4 is assumed in the selection of the frequency diversity mode. At this time, the variation of the received SINR in the femto-cell BS 200 is small. In such an environment, the time diversity effect that can be obtained by increasing the number of HARQ transmissions is likely to be small. Thus, the reduction in the number of HARQ transmissions reduces the time delay from the start of the uplink data transmission to the success of decoding.

The number of HARQ transmissions can be reduced by selecting a low MCS. When a low MCS is selected, the SINR required for the success of decoding is reduced. Thus, comparing the case of selecting a low MCS to the case of selecting a high MCS with the received power spectrum density constant, the probability of success of decoding in each HARQ transmission is higher with a low MCS than that with a high MCS.

Figure 30:
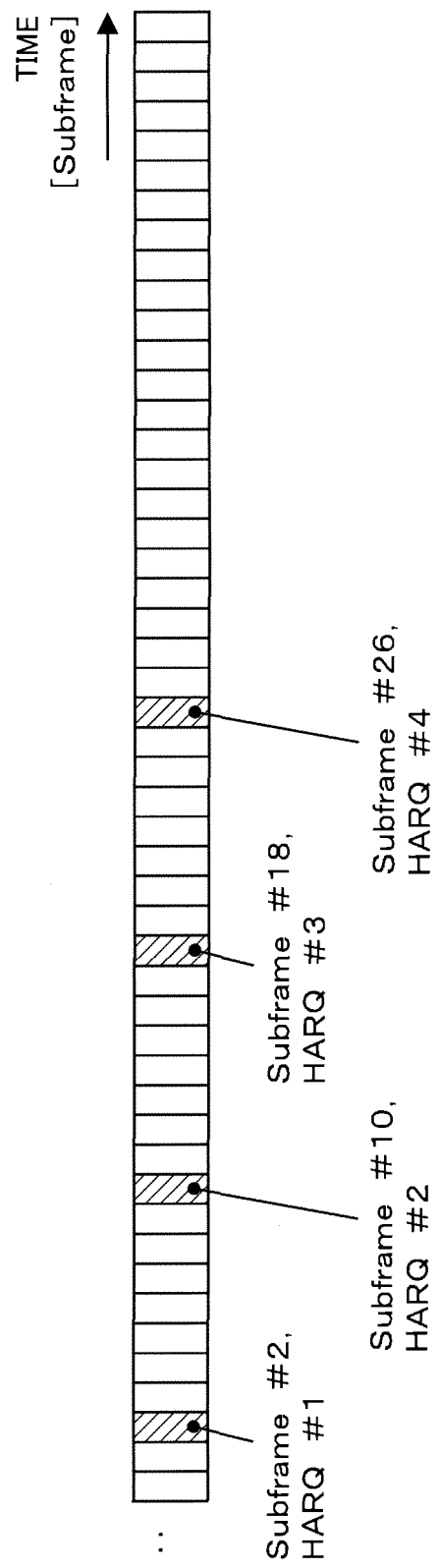
FIG. 30 is a diagram showing HARQ transmission.

More specifically, in the frequency diversity mode, the MCS is selected so as to achieve a predetermined (for example, 1%) packet error rate (PER) in the first HARQ transmission (subframe 2 in FIG. 30).

The femto-cell arrangement shown in FIG. 4 is assumed in the selection of the time diversity mode. In this case, the received SINR varies in the femto-cell BS 200. In such an environment, the time diversity effect can be obtained by increasing the number of HARQ transmissions. In this way, even in the environment where the received SINR varies, the variation of the received SINR can be absorbed by HARQ to realize stable data transmission.

The number of HARQ transmissions can be increased by selecting a high MCS. When a high MCS is selected, the SINR required for the success of decoding is increased. Thus, comparing the case of selecting a high MCS to the case of selecting a low MCS with the received power spectrum density being constant, the probability of success of decoding in each HARQ transmission is lower with a high MCS than that with a low MCS. More specifically, in the time diversity mode, the MCS is selected so as to achieve a predetermined (for example, 1%) packet error rate (PER) in the fourth HARQ transmission (subframe 26 in FIG. 30).

The MCS used for the uplink data transmission to the femto-cell MT 300 is determined by the uplink scheduler 225 of the femto-cell BS 200, according to the uplink scheduling mode determined by the uplink scheduling mode switching block 224. The determined MCS is notified, as the uplink scheduling information, by the femto-cell BS 200 to the femto-cell MT 300 in step 125 of FIG. 21 or in step 154 of FIG. 24. The uplink data transmission in step 126 of FIG. 21 and in step 155 of FIG. 24 is performed according to the uplink scheduling information notified to the femto-cell MT 300.

Sixth Embodiment

A sixth embodiment that uses the uplink scheduling mode properly will be described with reference to FIGS. 16 and 17. Note that FIGS. 17 and 16 are diagrams showing the presence or absence of frequency hopping of the downlink, but "downlink" is replaced with "uplink" in the following description.

According to the sixth embodiment, in the time diversity mode, the influence of interference from the macro-cell MT 400 to the femto-cell BS 200 is distributed by applying frequency hopping to the frequency resource assigned as the uplink communication resource. In the frequency diversity mode, as described with reference to FIG. 4, the variation of the received SINR in the femto-cell BS 200 is small. Thus, frequency hopping is not applied to the frequency resource assigned as the downlink communication resource. In the following description, it is assumed that the frequency hopping is performed for each HARQ transmission. The assignment of the frequency resource used for the uplink data transmission to the femto-cell MT 300, as well as the determination of whether frequency hopping is applied or not, are performed by the uplink scheduler 225 of the femto-cell BS 200 according to the uplink scheduling mode determined by the uplink scheduling mode switching block 224. The assigned frequency resource is notified, as the uplink scheduling information, by the femto-cell BS 200 to the femto-cell MT 300 in step 125 of FIG. 21 or in step 154 of FIG. 24. The uplink data transmission in step 126 of FIG. 21 or in step 155 of FIG. 24 is performed according to the uplink scheduling information that is notified by the femto-cell BS 200 to the femto-cell MT 300 as described above.

The frequency resource assignment to which frequency hopping is applied, which is used in the time diversity mode, will be described with reference to FIG. 17. In FIG. 17, RBs assigned to the terminal #1 are different for each of the HARQ transmissions (1, 2, 3, and 4). In this case, when frequency hopping is applied, the macro-cell MT 400 giving the influence of interference to the communication of the particular femto-cell MT, is expected to be different for each HARQ transmission. At this time, the influence of interference from the macro-cell 400 is distributed. As a result, the degradation of communication quality due to the interference can be suppressed in the femto-cell.

The frequency resource assignment to which frequency hopping is not applied, which is used in the frequency diversity mode, will be described with reference to FIG. 16. In FIG. 16, RBs assigned to the terminal #1 are the same in the first HARQ transmission (1 in FIG. 16) and in the subsequent HARQ transmissions (2, 3, and 4 of FIG. 16). In FIG. 16, the same RBs are assigned to the individual HARQ transmissions. However, the same RBs are not necessarily assigned, and is enough to assign RBs in the same subband. Further, in the frequency diversity mode, frequency hopping may be applied if the frequency selectivity gain is not expected in the frequency diversity mode.

Seventh Embodiment

A seventh embodiment that uses the uplink scheduling mode properly will be described with reference to FIGS. 12 to 15B. Note that FIGS. 12 to 15B are diagrams showing the frequency resource assignment of the downlink, but "downlink" is replaced with "uplink" in the following description.

According to the seventh embodiment, in the frequency diversity mode, it is intended to increase the rate due to the frequency selectivity gain by assigning frequency resources that are continuous in the frequency domain as uplink communication resources. Further, in the time diversity mode, the influence of interference from the macro-cell MT 400 to the femto-cell BS 200 is distributed by assigning frequency resources distributed in the frequency domain. The assignment of frequency resources used for the uplink data transmission to the femto-cell MT 300 is performed by the uplink scheduler 225 of the femto-cell BS 200, according to the uplink scheduling mode determined by the uplink scheduling mode switching block 224. The assigned frequency resources are notified, as the uplink scheduling information, by the femto-cell BS 200 to the femto-cell MT 300 in step 125 of FIG. 21 or in step 154 of FIG. 24. The uplink data transmission in step 126 of FIG. 21 or in step 155 of FIG. 24 is performed according to the uplink scheduling information notified to the femto-cell MT 300.

The frequency resource assignment in the frequency diversity mode is performed by using the schemes shown in FIGS. 12 and 13. The frequency resource assignment pattern has been described with reference to FIGS. 12 and 13. The frequency selectivity gain is obtained by centrally assigning RBs in a subband with a good radio channel quality as shown in FIGS. 12 and 13. As a result, the communication quality can be improved.

Figure 15:
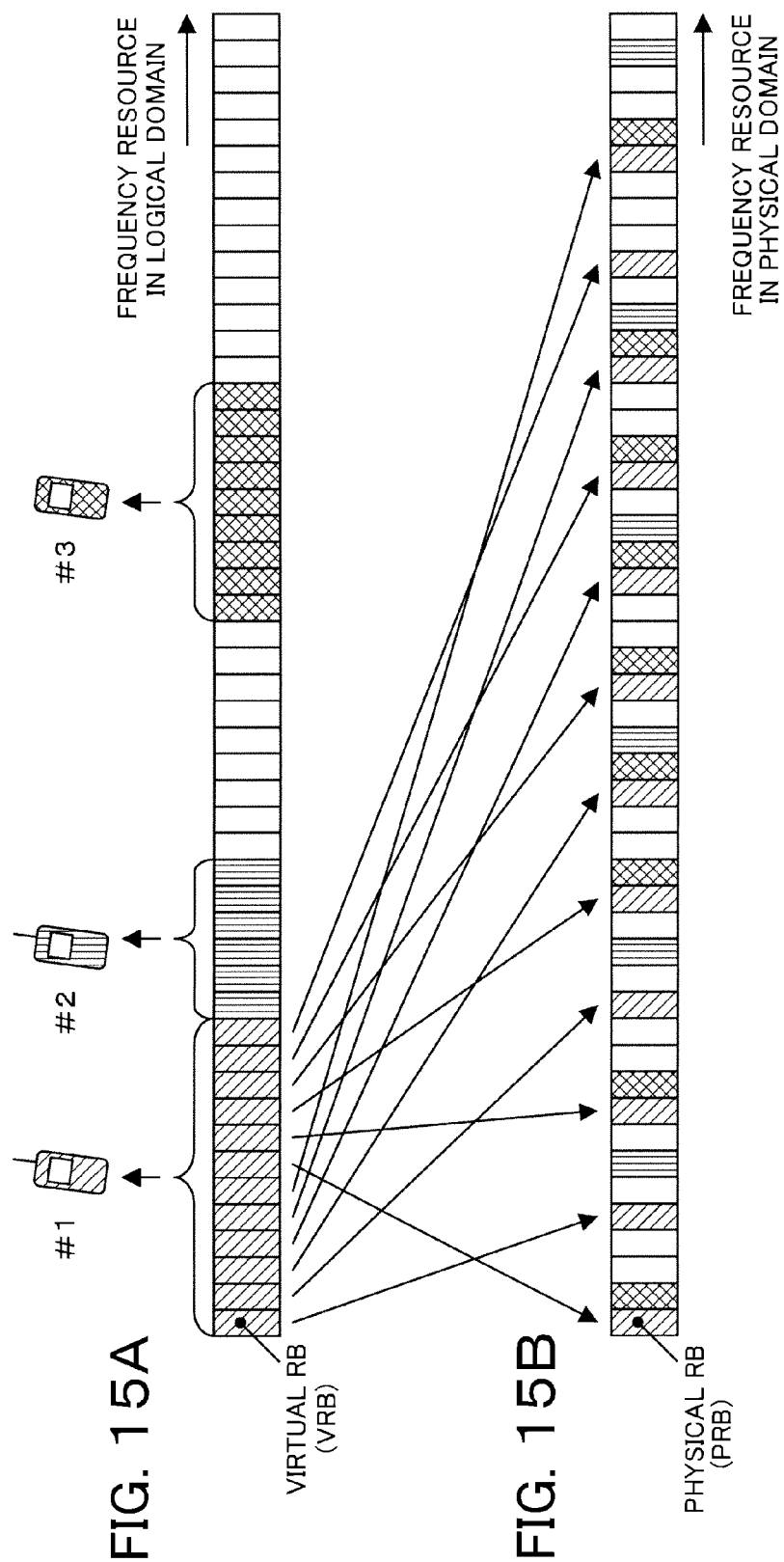
FIGS. 15A and 15B are diagrams showing frequency resource assignment in interference mitigation mode.

The frequency resource assignment in the time diversity mode is performed by using the schemes shown in FIGS. 14 to 15B. The frequency resource assignment pattern has been described with reference to FIGS. 14 to 15B. When distributed RBs are assigned as shown in FIG. 14 to 15B, the macro-cell MT 400 giving the influence of interference is expected to be different for each RB. At this time, the influence of interference given to the uplink data communication of the femto-cell MT 300 is distributed. As a result, the degradation of communication quality due to the interference can be suppressed in the femto-cell BS 200.

The fourth to seventh embodiments are not exclusive of each other, and a plurality of embodiments can be combined and used.

According to the embodiments described above, the radio communication quality is improved by preventing the occurrence of interference between the femto-cell BS and the macro-cell MT, or between the macro-cell BS and the femto-cell MT. This contributes to the improvement of the efficiency in the use of radio resources.

What is claimed is:

1. A base station being installed in a communication area of an existing base station, and performing radio communication with a first mobile terminal, the base station being configured to:

estimate a magnitude of radio interference given by the base station to a second mobile terminal that performs radio communication with the existing base station and a location of the base station, which is either one of close to the communication area center and close to the communication area edge of the existing base station, based on notified information from the first mobile terminal;

select a high data rate mode as a downlink scheduling mode when the base station is located close to the communication area center of the existing base station and the radio interference given by the base station to the second mobile terminal is small; and select an interference mitigation mode as the downlink scheduling mode when the base station is located close to the communication area edge of the existing base station and the radio interference given by the base station to the second mobile terminal is large.

2. The base station according to claim 1, wherein the base station is configured to estimate the magnitude of the radio interference given by the base station to the second mobile terminal that performs radio communication with the existing base station, based on received power of a reference signal transmitted by the existing base station to the first mobile terminal; and wherein the base station is configured to estimate the location of the base station, which is either one of close to the communication area center and close to the communication area edge of the existing base station, based on a ratio of a number of first mobile terminals with the received signal power exceeding a threshold.

3. The base station according to claim 1, wherein the base station is configured to estimate the magnitude of the radio interference given by the base station to the existing mobile terminal that performs radio communication with the existing base station, based on a channel attenuation level in a radio channel between the second base station and the first mobile terminal; and wherein the base station is configured to estimate the location of the base station, which is either one of close to the communication area center and close to the communication area edge of the existing base station, based on a ratio of a number of first mobile terminals with the channel attenuation level exceeding a threshold.

4. The base station according to claim 1, wherein the base station is configured to estimate the magnitude of the radio interference given by the base station to the second mobile terminal that performs radio communication with the existing base station, based on the received power of the interference to the base station caused by an uplink transmission signal transmitted by the existing mobile terminal to the second base station; and wherein the base station is configured to estimate the location of the base station, which is either one of close to the communication area center and close to the communication area edge of the existing base station, based on existence or non-existence of frequency block with uplink interference power level exceeding a threshold.

5. The base station according to claim 1, wherein, in the high data rate mode, the base station is configured to assign downlink communication resources that are continuous in the frequency domain to the first mobile terminal; and wherein, in the interference mitigation mode, the base station is configured to assign downlink communication resources that are not continuous in a frequency domain to the first mobile terminal.

6. The base station according to claim 1, wherein, in the high data rate mode, the base station is configured to perform downlink data transmission to the first mobile terminal by using spatial multiplexing; and wherein, in the interference mitigation mode, the base station is configured to perform downlink data transmission to the first mobile terminal by using time-space diversity.

7. The base station according to claim 1, wherein, in the high data rate mode, the base station is configured to not apply frequency hopping to downlink communication resources to be assigned to the first mobile terminal; and wherein, in the interference mitigation mode, the base station is configured to apply frequency hopping to downlink communication resources to be assigned to the first mobile terminal.

8. The base station according to claim 1, wherein, in the high data rate mode, the base station is configured to perform downlink data transmission to the first mobile terminal by using a first power spectrum density;

wherein, in the interference mitigation mode, the base station is configured to perform downlink data transmission to the first mobile terminal by using a second power spectrum density; and wherein the first power spectrum density is greater than the second power spectrum density.

9. The base station according to claim 8, wherein, in the high data rate mode, the base station is configured to perform downlink data transmission to the first mobile terminal by using a first modulation scheme and a first coding rate of forward error correction;

wherein, in the interference mitigation mode, the base station is configured to perform downlink data transmission to the first mobile terminal by using a second modulation scheme and a second coding rate of forward error correction; and wherein one of (A) the first modulation scheme has more values than the second modulation scheme, (B) the first coding rate is greater than the second coding rate, and (C) the first modulation scheme has more values than the second modulation scheme and the first coding rate is smaller than the second coding rate, is effective.

10. The base station according to claim 1, wherein when the interference mitigation mode is selected according to the estimation that the location of the base station is close to the communication area edge of the existing base station by the base station, the base station is configured to stop using the interference mitigation mode and select the high data rate mode when the second mobile terminal is not present in the vicinity of the base station.

11. A base station being installed in a communication area of an existing base station, and performing radio communication with a first mobile terminal, the base station being configured to:

estimate a magnitude of radio interference given by the base station to a second mobile terminal that performs radio communication with the existing base station and a location of the base station, which is either one of close to the communication area center and close to the communication area edge of the existing base station, based on notified information from the first mobile terminal;

select a frequency diversity mode as a uplink scheduling mode for applying the first mobile terminal when the base station is located close to the communication area center of the existing base station and the radio interference given by the base station to the second mobile terminal is small; and select a time diversity mode as the uplink scheduling mode for applying the first mobile terminal when the base station is located close to the communication area edge of the existing base station and the radio interference given by the base station to the second mobile terminal is large.

12. The base station according to claim 11,
wherein the base station is configured to estimate the magnitude of the radio interference to the base station from the second mobile terminal that performs radio communication with the existing base station, based on received power of a reference signal transmitted by the existing base station to the first mobile terminal;
wherein the base station is configured to estimate the location of the base station, which is either one of close to the communication area center and close to the communication area edge of the existing base station, based on a ratio of a number of first mobile terminals with the received signal power exceeding a threshold.

13. The base station according to claim 11,
wherein the base station is configured to determine the magnitude of the radio interference to the base station from the second mobile terminal that performs radio communication with the existing base station, based on a channel attenuation level in radio channels between the existing base station and the first mobile terminal
wherein the base station is configured to estimate the location of the base station, which is either one of close to the communication area center and close to the communication area edge of the existing base station, based on a ratio of a number of first mobile terminals with the channel attenuation level exceeding a threshold.

14. The base station according to claim 11,
wherein the base station is configured to determine the magnitude of the radio interference to the base station from the second mobile terminal that performs radio communication with the existing base station, based on the received power of the interference to the base station caused by the uplink transmission signal transmitted by the second mobile terminal to the existing base station;
wherein the base station is configured to estimate the location of the base station, which is either one of close to the communication area center and close to the communication area edge of the existing base station, based on existence or non-existence of frequency block with uplink interference power level exceeding a threshold.

15. The base station according to claim 11,
wherein, in the frequency diversity mode, the base station is configured to set a first retransmission target number in the data uplink data transmission from the first mobile terminal;
wherein, in the time diversity mode, the base station is configured to set a second retransmission target number in the uplink data transmission from the first mobile terminal; and
wherein the first retransmission target number is smaller than the second retransmission target number.

16. The base station according to claim 11,
wherein, in the frequency diversity mode, the base station is configured to not apply frequency hopping to uplink communication resources assigned to the first mobile terminal; and
wherein, in the time diversity mode, the base station is configured to apply frequency hopping to uplink communication resources assigned to the first mobile terminal.

17. The base station according to claim 11,
wherein, in the frequency diversity mode, the base station is configured to assign uplink communication resources that are continuous in a frequency domain, to the first mobile terminal; and
wherein, in the time diversity mode, the base station is configured to assign uplink communication resources that are not continuous in a frequency domain to the first mobile terminal.

18. The base station according to claim 11,
wherein, in the frequency diversity mode, the base station is configured to allow the first mobile terminal to perform uplink data transmission by using a first power spectrum density;
wherein, in the time diversity mode, the base station is configured to allow the first mobile terminal to perform uplink data transmission by using a second power spectrum density; and
wherein the second power spectrum density is greater than the first power spectrum density.

19. The base station according to claim 11,
wherein when the time diversity mode is selected according to the radio interference to the base station from the second mobile terminal, the base station is configured to stop using the time diversity mode and selects the frequency diversity mode when the second mobile terminal is not present in the vicinity of the base station.

20. The base station according to claim 18,
wherein, in the frequency diversity mode, the base station is configured to allow the first mobile terminal to perform uplink data transmission by using a first modulation scheme and a first coding rate of forward error correction;
wherein, in the time diversity mode, the base station is configured to allow the first mobile terminal to perform uplink data transmission by using a second modulation scheme and a second coding rate of forward error correction; and
wherein one of (A) the second modulation scheme has more values than the first modulation scheme, (B) the second coding rate is greater than the first coding rate, and (C) the second modulation scheme has more values than the first modulation scheme and the second coding rate is greater than the first coding rate, is effective.

* * * * *